(12) United States Patent
Yoshii

(10) Patent No.: US 7,685,243 B2
(45) Date of Patent: Mar. 23, 2010

(54) MAIL SERVER, MAIL RECEPTION DEVICE, MAIL SERVER PROGRAM STORAGE MEDIUM, MAIL RECEPTION PROGRAM STORAGE MEDIUM, MAIL MEDIATION METHOD, AND MAIL RECEPTION

(75) Inventor: Tomohiro Yoshii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 11/889,627

(22) Filed: Aug. 15, 2007

(65) Prior Publication Data

US 2007/0288581 A1 Dec. 13, 2007

Related U.S. Application Data

(63) Continuation of application No. PCT/JP2005/002462, filed on Feb. 17, 2005.

(51) Int. Cl.
G06F 15/16 (2006.01)
(52) U.S. Cl. .................... 709/206; 709/207
(58) Field of Classification Search ............. 709/206
See application file for complete search history.

(56) References Cited

U.S. PATENT DOCUMENTS

| | | | |
|---|---|---|---|
| 6,487,557 B1* | 11/2002 | Nagatomo | 707/102 |
| 2002/0059142 A1* | 5/2002 | Krause et al. | 705/44 |
| 2002/0161613 A1* | 10/2002 | Hida | 705/7 |
| 2003/0091167 A1 | 5/2003 | Hirai | |
| 2003/0115116 A1* | 6/2003 | Crampton | 705/27 |
| 2003/0149776 A1* | 8/2003 | Tsunezumi | 709/228 |
| 2003/0182380 A1 | 9/2003 | Yabe et al. | |
| 2007/0094337 A1* | 4/2007 | Klassen et al. | 709/206 |
| 2007/0260807 A1* | 11/2007 | Noda | 711/100 |
| 2008/0233923 A1* | 9/2008 | Shinya | 455/412.1 |

FOREIGN PATENT DOCUMENTS

| | | |
|---|---|---|
| JP | 6-139164 | 5/1994 |
| JP | 2000-196771 | 7/2000 |
| JP | 2001-265672 | 9/2001 |
| JP | 2001-356984 | 12/2001 |

(Continued)

OTHER PUBLICATIONS

Aiden Duane, Managing Email Usage: A Cross Case Analysis of Experiences with Electronic Monitoring and Control, 2004.*

(Continued)

Primary Examiner—Firmin Backer
Assistant Examiner—Arvin Eskandarnia

(57) ABSTRACT

The present invention relates to a mail server, a mail reception device and the like of a mail system for mutually performing transmission and reception of a mail between mobile devices or personal computers (PCs) through mediation of a mail server, which construct a mail system for significantly alleviating labor for a user on changing a mail address and for reducing network traffic. The mail server receives a change of the mail address of a user device and manages history of the mail address of the user device, receives a mail destined to a destination device from a mail transmission side device, and attaches the history of the mail address of the mail transmission side device to the received mail so as to transmit the mail having the history attached thereto to the destination device.

24 Claims, 20 Drawing Sheets

FOREIGN PATENT DOCUMENTS

| | | |
|---|---|---|
| JP | 2003-108482 | 4/2003 |
| JP | 2003324481 A * | 11/2003 |
| JP | 2004-40304 | 2/2004 |
| JP | 2004-88402 | 3/2004 |
| KR | 2003/28723 | 4/2003 |
| KR | 10-0466761 | 1/2005 |

OTHER PUBLICATIONS

Robert J. hall, How To Avoid Unwanted Email, 1998.*

Korean Office Action issued on Feb. 13, 2009 in corresponding Korean Patent Application 10-2007-7017762.

International Search Report of International Application PCT/JP2005/002462 (mailed May 17, 2005).

PCT Notification Concerning Transmittal of International Preliminary Report on Patentability along with written opinion; Aug. 30, 2007; PCT/JP2005/002462 filed on Feb. 17, 2005.

Chinese Office Action issued on Oct. 10, 2008 in corresponding Chinese Patent Application No. 200580048415.5.

* cited by examiner

MAIL SERVER, MAIL RECEPTION DEVICE, MAIL SERVER PROGRAM STORAGE MEDIUM, MAIL RECEPTION PROGRAM STORAGE MEDIUM, MAIL MEDIATION METHOD, AND MAIL RECEPTION

CROSS REFERENCE TO RELATED APPLICATION

This application is a continuing application, filed under 35 U.S.C. §111(a), of International Application PCT/JP2005/002462, filed Feb. 17, 2005, the contents of which are incorporated herein by reference.

TECHNICAL FIELD

The present invention relates to a mail server, a mail reception device, a mail server program storage medium, a mail reception program storage medium, a mail mediation method and a mail reception method of a mailing system for performing transmission and reception of a mail between mobile devices or personal computers (PC) through mediation of a mail server.

BACKGROUND ART

In recent years, there has been worldwide diffusion of a system for transmitting and receiving an e-mail via a network such as the Internet or an LAN (Local Area Network). A PC, a cell-phone and the like are heavily used as devices for transmitting and receiving the e-mail. This system normally has a mail server intervening between a transmission side device and a reception side device of an e-mail. The e-mail transmitted from the transmission side device is once stored in a mail server and is then transmitted to the reception side device from the mail server.

Normally, each individual device has a mail address unique to it, and the mail address is managed by the mail server of the system to which the device subscribes. A user of each individual device sometimes needs to change the mail address of the user's own device from a viewpoint of a measure for junk mail rejection for instance. This mail system is configured to allow the mail address of the device to be changed.

Here, as for the user who has changed the mail address of the user's own device, it is conventionally necessary to notify the devices of persons concerned including friends and business partners who are likely to transmit an e-mail to the user's own device of the change of the mail address and a new mail address thereof after the change so as to have the persons concerned recognize the change of the mail address. This work normally requires considerable labor. And those who have received the notification need to accurately register the new mail address with an address book or accurately update the address book each time new mail addresses are notified by various parties. This management of the mail address is considerably burdensome.

To alleviate this burden, Patent Documents 1 and 2 make a proposal that, upon receiving the notification of change of the mail address, the address book of the reception side device is automatically updated with a new mail address after the change. Patent Document 3 makes a proposal to intensively manage a telephone directory with a database and notify each personal telephone from a database device upon a change of a telephone number so that each personal telephone automatically updates the telephone directory stored therein with the telephone number notified of.

Patent Document 1: Japanese Patent Laid-Open No. 6-139164
Patent Document 2: Japanese Patent Laid-Open No. 2001-356984
Patent Document 3: Japanese Patent Laid-Open No. 2000-196771

DISCLOSURE OF THE INVENTION

According to the techniques disclosed in the Patent Documents 1 to 3, the burden on the reception side is alleviated to an extent.

As for the techniques disclosed in the Patent Documents 1 to 3, however, it is necessary, in the case where the mail address has been changed, to notify the persons concerned that the change has been made. Therefore, there is a possibility that the number of mail address change notification mails may become massive and a traffic load of the network may increase.

An ordinary mail system does not adopt the system disclosed in Patent Document 3 for intensively managing the address book and notifying the change of the mail address. Even if such a system is adopted, it is necessary for the user trying to change the mail address to closely examine whether or not the user's address book includes the persons to whom the user does not wish notification of the new mail address by closely looking into the intensively managed address book. Therefore, the labor is not reduced so much if only the notification of the mail address change is automatically performed.

In view of the circumstances, an object of the present invention is to provide a mail server, a mail reception device, a mail server program, a mail reception program, a mail mediation method and a mail reception method that are suited to construction of a mail system for significantly alleviating the labor for the user on changing the mail address and reducing traffic of the network.

To attain the object, the present invention provides a mail server including:

an address-change accepting section which accepts a change of a mail address of a user device;

an address-history management section which manages history of the mail addresses of the user device;

a mail receiving section which receives a mail to a destination device from a transmission origin device; and a mail transmitting section which attaches history of mail addresses of the transmission origin device to the received mail and transmits the mail having the history attached thereto to the destination device.

The mail server of the present invention transmits the mail having the history of the mail addresses attached thereto to the destination device. Therefore, in the case where the mail address of the transmission origin device has been changed, the destination device can know its new address after that change. On the transmission side of the mail, the change of the mail address is simultaneously notified by transmitting a mail describing business other than the change of the mail address. Therefore, there is no need to be conscious of notifying that the change of the mail address has been made so that labor of changing the mail address is significantly alleviated and further, increase in network traffic is suppressed.

Here, it is desirable that, as to the mail server of the present invention, the address-history management section manage the history of the mail addresses of the user device, that is, a first mail address and all the mail addresses changed thereafter of the user device, and the mail transmitting section attach, to a mail transmitted to the destination device, all the history of mail addresses of the transmission origin device of the mail managed by the address-history management section and transmit the mail having the history attached thereto to the destination device.

In this case, no matter how many times the mail address is changed, the other party to whom a mail is transmitted after a long interval is notified of the user's recent mail address correspondingly to a considerably old address known to the other party.

It is also possible that, as to the mail server of the present invention, the address-history management section manages the history of the mail addresses of the user device up to a mail address tracked back by a predetermined or larger number of times of change, and the mail transmitting section attaches, to a mail to be transmitted to the destination device, up to the history of the mail addresses tracked back by the predetermined number of times of change out of the history of mail addresses of the transmission origin device of the mail managed by the address-history management section and transmits the mail having the history attached thereto to the destination device.

Here, to "manage up to a mail address tracked back by a predetermined or larger number of times of change" means that, in the case where the history of the mail addresses attached to the mail to be transmitted to the destination device is "the history of the mail addresses tracked back by the predetermined number of times of change" (for instance, mail addresses tracked back by two changes in the past, that is, the history of the mail addresses composed of a current mail address, a mail address preceding by one change and a mail address preceding by one more change (preceding by two changes from now)), then at least the mail addresses of up to the predetermined number of times (here, the mail addresses tracked back by two changes in the past) may be managed, or the mail addresses of a larger number of times of change (three times or more in the example here) or the mail addresses of all the past changes may be managed.

There are many cases where a mail address which is too old does not need notification to the other party itself. It is possible to reduce a transmitted data amount more or less by limiting the history attached to the mail transmitted to the destination device to the mail addresses of the predetermined number of times of change.

To attain the object, the present invention provides a mail reception device including:

an address-book management section which manages at least a mail address list of some user devices;

a mail receiving section which receives a mail to which history of mail addresses of a transmission origin device is attached;

a transmission-origin identification section which recognizes the transmission origin device of the mail received by the mail receiving section by checking the mail address recorded in the history attached to the mail against the mail address managed by the address-book management section; and a user notification section which notifies a user in a case where the transmission-origin identification section recognizes the transmission origin device of the mail received by the mail receiving section based on past mail addresses of the transmission origin device.

Here, the user notification section may notify the user by displaying text or a figure or by a sound such as a melody or by a combination of both thereof.

The "at least a mail address list of some user devices" means that the mail address list does not need to be that of all the devices subscribing to this system but may be the mail address list of some of the user devices to be utilized by that device.

Here, it is also thinkable that, as a mail concerning a matter other than the notification of change of the mail address having nothing to do with change of the mail address is transmitted with the history of mail addresses attached thereto, the change of the mail address is not noticeable just by opening and reading the mail. Here, it is possible, by including the user notification section, to impress upon the user of the mail reception device that the mail address has been changed.

Here, as for the mail reception device of the present invention, it is desirable that the transmission-origin identification section check the mail addresses recorded in the history attached to the mail received by the mail receiving section against the mail addresses managed by the address-book management section in an order of tracking back from a current mail address to the past mail addresses.

Of the entire number of received mails, there are overwhelmingly large numbers of received mails of which transmission side mail addresses have not been changed. There are few cases where the transmission side mail addresses have been changed, and there are even fewer cases where the mail addresses have been changed multiple times. Therefore, the mail addresses are checked in order from the current mail address to the past mail addresses so that there is a higher possibility of reducing the time required for the check.

It is desirable that the mail reception device of the present invention further include a receipt processing section which performs receipt processing according to the transmission origin device after the transmission origin device is recognized by the transmission-origin identification section.

In the case of a cell-phone or the like which is utilizable as the mail reception device, there is normally a model capable of setting the receipt processing suited to a transmitter (transmission side mail address) of the received mail, such as displaying a name or a nickname of the transmitter or playing a melody suited to the transmitter according to the transmitter.

The mail reception device of the present invention can identify the transmitter of the mail even if the mail address before update is registered with the address book. Therefore, if the mail reception device is provided with a function of setting up the receipt processing suited to the transmitter of the mail, that function acts more effectively than before.

Furthermore, it is desirable that the mail reception device provided by the present invention further include:

an automatic-update-mode setting section which sets up and releases an automatic update mode automatically updating a past mail address of the transmission origin device managed by the address-book management section to a current mail address of the transmission origin device following a user operation of setup and release respectively in a case where the transmission origin device is recognized based on the past mail addresses of the transmission origin device, wherein, in a case where the automatic update mode is set, the address-book management section updates the past mail address of the transmission origin device managed by the address-book management section to the current mail address of the transmission origin device without waiting for the user operation after the transmission-origin identification section recognizes the transmission origin device of the mail received by the mail receiving section based on the past mail addresses of the transmission origin device.

The burden of address book management for the user of the mail reception device is reduced by having such an automatic update mode.

In this case, however, it is desirable that the address-book management section restore the mail address automatically updated in the automatic update mode to the mail address before the update following a cancel operation by the user.

Thus, the device is configured to restore the automatically updated mail address to the mail address before the update by the user operation so that it is possible to prevent a situation in which the mail address remains automatically updated on its own by a junk mail assuming a transmission origin mail address (from header).

In the case of the mail reception device having the automatic update mode, it is desirable that, when the automatic update mode is yet to be set and the transmission-origin identification section recognizes the transmission origin device of the mail received by the mail receiving section based on the past mail addresses of the transmission origin device, the address-book management section updates the past mail address of the transmission origin device managed by the address-book management section to the current mail address of the transmission origin device following an update operation by the user.

If such an automatic update mode is selected, the address book is updated after undergoing confirmation by the user. Therefore, it is possible to more effectively prevent falsification of the address book by the junk mail or the like.

Furthermore, concerning the mail reception device of the present invention, the user notification section should desirably notify the user that the transmission-origin identification section has recognized the transmission origin device of the mail received by the mail receiving section based on the past mail addresses of the transmission origin device at one of time points of receiving the mail, opening the mail by the user operation, and displaying the mail addresses of the transmission origin device managed by the address-book management section.

As the user becomes conscious of the mail or the mail address at these time points, it is possible to call the user's attention by providing notification at the time point when the user becomes conscious.

To attain the object, the present invention provides a computer readable medium storing a mail server program to be executed in an information processing device having a program executing function and a data transmitting and receiving function, the program causing the information processing device to operate as a mail server including:

an address-change accepting section which accepts a change of a mail address of a user device;

an address-history management section which manages history of the mail addresses of the user device;

a mail receiving section which receives a mail to a destination device from a transmission origin device; and a mail transmitting section which attaches history of mail addresses of the transmission origin device to the received mail and transmits the mail having the history attached thereto to the destination device.

Here, in the mail server program storage medium, it is desirable that the address-history management section manage the history of the mail addresses of the user device including a first mail address and all the mail addresses changed thereafter of the user device, and the mail transmitting section attach, to a mail to be transmitted to the destination device, all the history of mail addresses of the transmission origin device of the mail managed by the address-history management section and transmit the mail having the history attached thereto to the destination device.

It is also possible that, as to the mail server program storage medium of the present invention, the address-history management section manages the history of the mail addresses of the user device up to a mail address tracked back by a predetermined or larger number of times of change, and the mail transmitting section attaches, to a mail to be transmitted to the destination device, up to the history of the mail addresses tracked back by the predetermined number of times of change out of the history of mail addresses of the transmission origin device of the mail managed by the address-history management section and transmits the mail having the history attached thereto to the destination device.

To attain the object, the present invention provides a computer readable medium storing a mail reception program to be executed in an information processing device having a program executing function and a data receiving function, the program causing the information processing device to operate as a mail reception device including:

an address-book management section which manages at least a mail address list of some user devices;

a mail receiving section which receives a mail to which history of mail addresses of a transmission origin device is attached;

a transmission-origin identification section which recognizes the transmission origin device of the mail received by the mail receiving section by checking the mail address recorded in the history attached to the mail against the mail address managed by the address-book management section; and a user notification section which notifies a user in a case where the transmission-origin identification section recognizes the transmission origin device of the mail received by the mail receiving section based on past mail addresses of the transmission origin device.

Here, as for the mail reception program storage medium of the present invention, it is desirable that the transmission-origin identification section check the mail addresses recorded in the history attached to the mail received by the mail receiving section against the mail addresses managed by the address-book management section in an order of tracking back from a current mail address to the past mail addresses.

It is also desirable that the mail reception program storage medium of the present invention causes the information processing device to operate as the mail reception device further including a receipt processing section which performs receipt processing according to the transmission origin device after the transmission origin device is recognized by the transmission-origin identification section.

Furthermore, as for the mail reception program storage medium provided by the present invention, it is desirable that the information processing device is caused to operate as the mail reception device further including:

an automatic-update-mode setting section which sets up and releases an automatic update mode automatically updating a past mail address of the transmission origin device managed by the address-book management section to a current mail address of the transmission origin device following a user operation of setup and release respectively in a case where the transmission origin device is recognized based on the past mail addresses of the transmission origin device, wherein, in a case where the automatic update mode is set, the address-book management section updates the past mail address of the transmission origin device managed by the address-book management section to the current mail address of the transmission origin device without waiting for the user operation after the transmission-origin identification section recognizes the transmission origin device of the mail received by the mail receiving section based on the past mail addresses of the transmission origin device. In this case, it is further desirable that the address-book management section restore the mail address automatically updated in the automatic update mode to the mail address before the update following a cancel operation by the user.

It is also a desirable aspect that, when the automatic update mode is yet to be set and the transmission-origin identification section recognizes the transmission origin device of the mail received by the mail receiving section based on the past mail addresses of the transmission origin device, the address-book management section updates the past mail address of the transmission origin device managed by the address-book management section to the current mail address of the transmission origin device following an update operation by the user.

Furthermore, concerning the mail reception program storage medium of the present invention, the user notification section should desirably notify the user that the transmission-origin identification section has recognized the transmission origin device of the mail received by the mail receiving section based on the past mail addresses of the transmission origin device at one of the time points of receiving the mail, opening the mail by the user operation, and displaying the mail addresses of the transmission origin device managed by the address-book management section by the user operation.

To attain the object, the present invention provides a mail mediation method including:

an address-history management step which accepts a change of a mail address of a user device and manages history of the mail addresses of the user device;

a mail receiving step which receives a mail to a destination device from a transmission origin device; and a mail transmitting step which attaches history of mail addresses of the transmission origin device to the received mail and transmits the mail having the history attached thereto to the destination device.

Here, it is desirable that, as to the mail mediation method of the present invention, the address-history management step be a step which manages the history of the mail addresses of the user device including a first mail address and all the mail addresses changed thereafter of the user device, and the mail transmitting step attaches, to a mail to be transmitted to the destination device, all the history of mail addresses of the transmission origin device of the mail managed by the address-history management step and transmit the mail having the history attached thereto to the destination device.

It is also possible that, as to the mail mediation method of the present invention, the address-history management step be a step which manages the history of the mail addresses of the user device up to a mail address tracked back by a predetermined or larger number of times of change, and the mail transmitting step is a step which attaches up to the history of the mail addresses tracked back by the predetermined number of times of change out of the history of mail addresses of the transmission origin device of the mail managed by the address-history management step to the mail transmitted to the destination device and transmits the mail having the history attached thereto to the destination device.

To attain the object, the present invention provides a mail reception method including:

an address-book management step which manages at least a mail address list of some user devices;

a mail receiving step which receives a mail having history of mail addresses of a transmission origin device attached thereto;

a transmission-origin identification step which recognizes the transmission origin device of the mail received by the mail receiving step by checking the mail address recorded in the history attached to the mail against the mail address managed by the address-book management step; and a user notification step which notifies a user in a case where the transmission-origin identification step recognizes the transmission origin device of the mail received by the mail receiving section based on past mail addresses of the transmission origin device.

Here, as for the mail reception method of the present invention, it is desirable that the transmission-origin identification step be a step which checks the mail addresses recorded in the history attached to the mail received by the mail receiving step against the mail addresses managed by the address-book management step in an order of tracking back from a current mail address to the past mail addresses.

It is desirable that the mail reception method of the present invention further include a receipt processing step which performs receipt processing according to the transmission origin device after the transmission origin device is recognized by the transmission-origin identification step.

Moreover, it is desirable that the mail reception method provided by the present invention further include:

an automatic-update-mode setting step which sets up and releases an automatic update mode automatically updating a past mail address of the transmission origin device managed by the address-book management step to a current mail address of the transmission origin device following a user operation of setup and release respectively in a case where the transmission origin device is recognized based on the past mail addresses of the transmission origin device, wherein the address-book management step be a step of, in the case where the automatic update mode is set, updating the past mail address of the transmission origin device managed by the address-book management step to the current mail address of the transmission origin device without waiting for the user operation after the transmission-origin identification step recognizes the transmission origin device of the mail received by the mail receiving step based on the past mail addresses of the transmission origin device. In this case, it is further desirable that the address-book management step be a step which restores the mail address automatically updated in the automatic update mode to the mail address before the update following a cancel operation by the user.

Furthermore, as for the mail reception method of the present invention, it is also desirable that, in the case where the automatic update mode is yet to be set and the transmission-origin identification step has recognized the transmission origin device of the mail received by the mail receiving step based on the past mail addresses of the transmission origin device, the address-book management step updates the past mail address of the transmission origin device managed by the address-book management step to the current mail address of the transmission origin device following an update operation by the user.

Furthermore, concerning the mail reception method of the present, invention, the user notification step should desirably be a step which notifies the user that the transmission-origin identification step has recognized the transmission origin device of the mail received by the mail receiving step based on the past mail addresses of the transmission origin device at one of time points of receiving the mail, opening the mail by the user operation, and displaying the mail addresses of the transmission origin device managed by the address-book management step by the user operation.

As above, according to the present invention, the labor on changing the mail address is alleviated and the network traffic is reduced.

BEST MODE FOR CARRYING OUT THE INVENTION

Embodiment(s) of the present invention will be described below with reference to the drawings.

Figure 1:
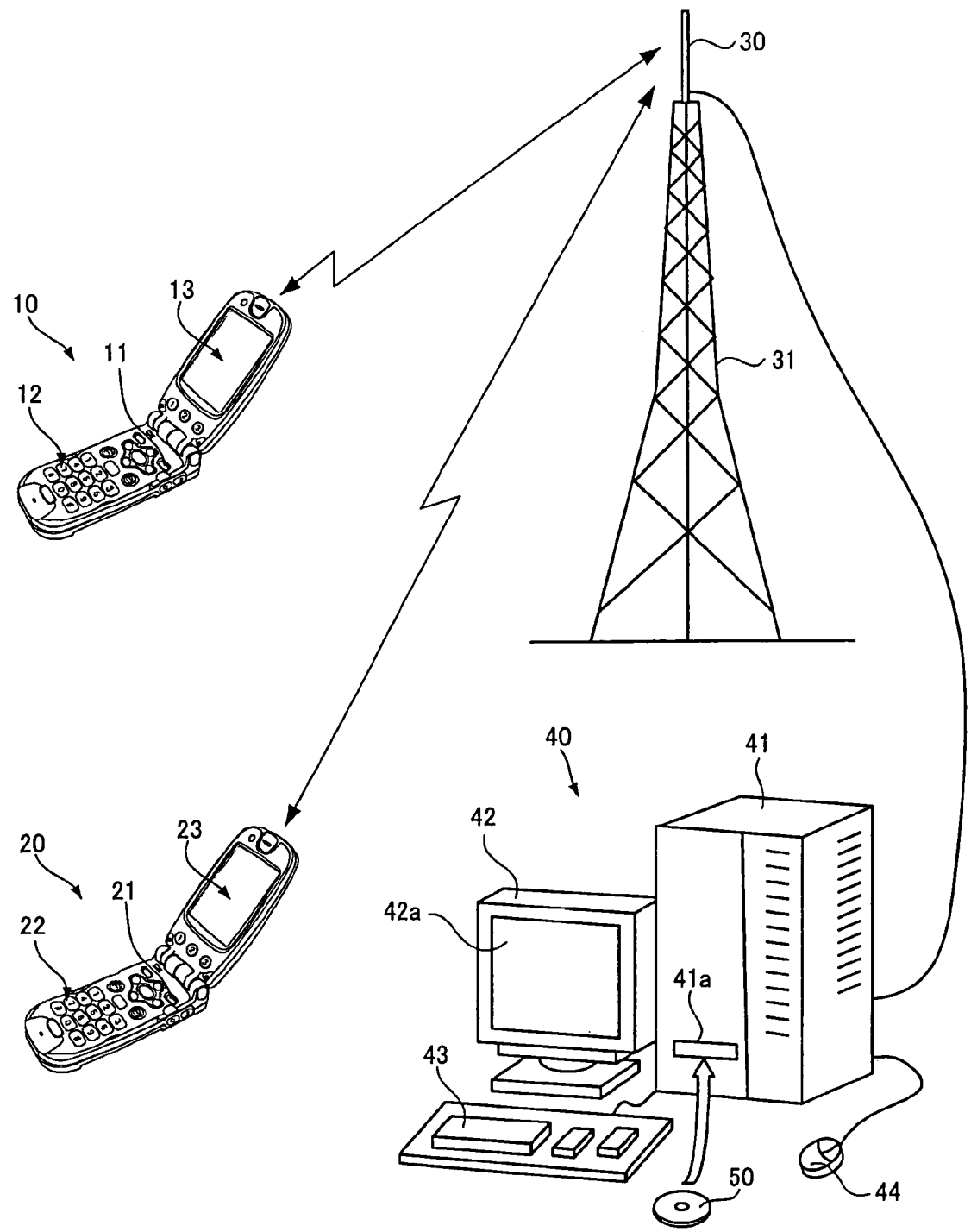
FIG. 1 is a schematic diagram showing an overview of a mail system to which an embodiment of the present invention is applied.

FIG. 1 is a schematic diagram showing an overview of a mail system to which an embodiment of the present invention is applied.

FIG. 1 shows two cell-phones 10, 20, an antenna 30 erected on an iron tower 31 and a mail server 40. Here, mails are transmitted and received between the cell-phones 10, 20 with the mail server 40 intervening.

The cell-phones 10, 20 include power keys 11, 21, operation buttons 12, 22 and LCD display screens 13, 23, and have transmitting and receiving functions as telephones and e-mail transmitting and receiving functions.

Here, in the present embodiment, the cell-phone 10 as one of the two cell-phones 10 and 20 will be described as a mail transmission device for transmitting a mail, and the other cell-phone 20 will be described as a mail reception device.

There are a large number of devices for transmitting and receiving mails which constitute this mail system. However, only two of them are representatively shown here.

The mail server is composed of a computer 40, which includes a main unit 41 having a CPU (Central Processing Unit), a RAM (Random Access Memory), a hard disk, a communication board and the like built therein, a display 42 for displaying an image on a display screen 42a according to an instruction from the main unit 41, a keyboard 43 for inputting an instruction of a user to the computer 40, and a mouse 44 for specifying an arbitrary position on the display screen 42a and thereby giving an instruction according to an icon or the like displayed in the specified position.

Furthermore, the main unit 41 outwardly includes a CD/DVD loading gate 41a for loading a CD 50 and a DVD (not shown). The main unit 41 has a CD/DVD drive for driving and accessing the CD 50 and DVD loaded from the CD/DVD loading gate 41a built therein.

Figure 2:
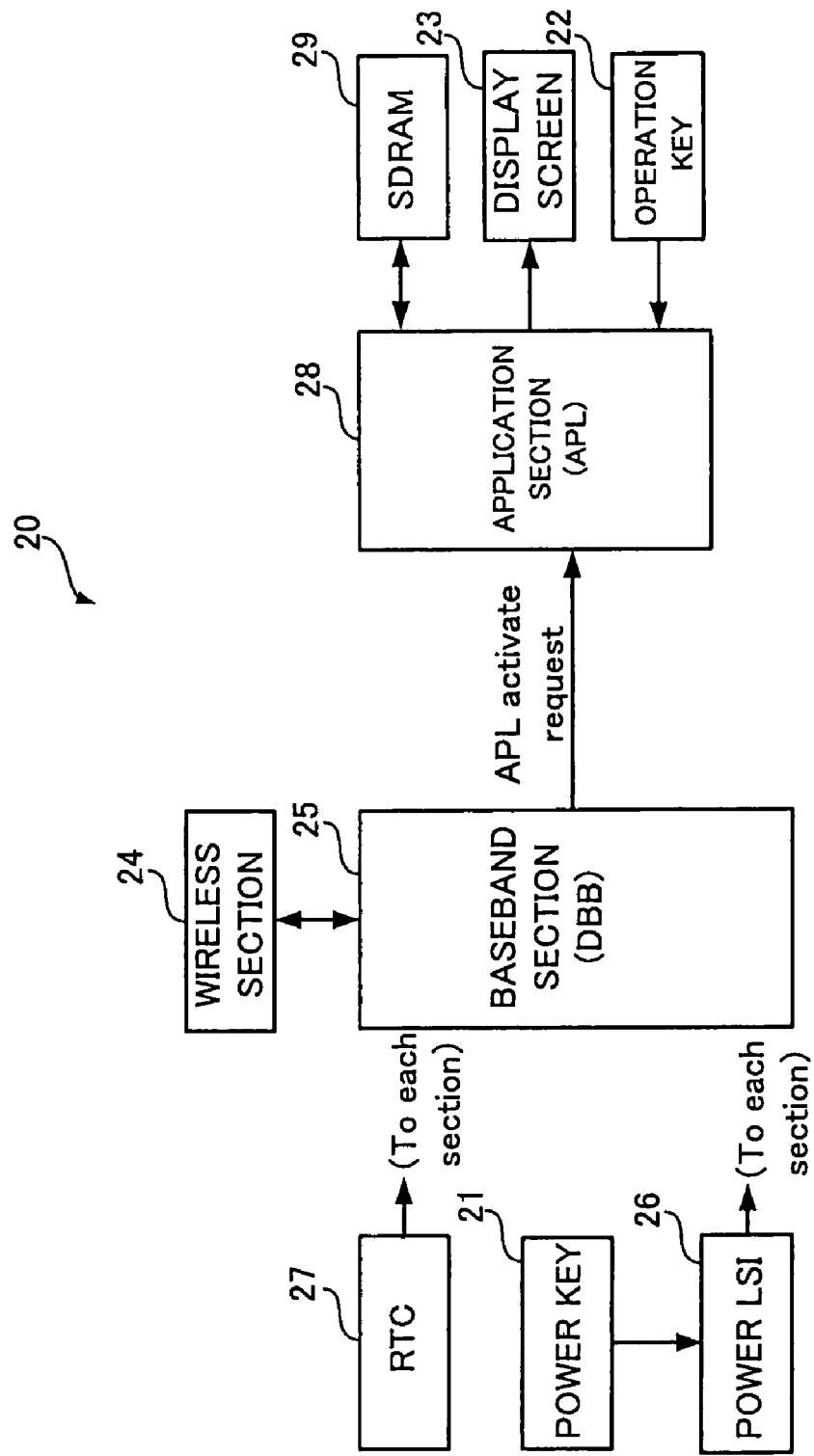
FIG. 2 is a circuit block diagram of a cell-phone of which appearance is shown in FIG. 1.

FIG. 2 is a circuit block diagram of the cell-phones 10, 20 of which appearance is shown in FIG. 1. The two cell-phones 10 and 20 both have the same configuration. Here, a description will be given as to the cell-phone 20 representatively described as the mail reception device.

The cell-phone 20 includes a wireless section 24 for performing radio communication, a base band section 25 for converting a signal received by the wireless section 24 to a base band signal and transmitting and receiving the signal to and from an application section 28 described later, the power key 21 for turning on and off the power also shown in FIG. 1, a power LSI 26 for raising a cell voltage and supplying the power to each portion of circuits, and an RTC (Real Time Clock) 27. The cell-phone 20 also includes the application section 28 containing the CPU and a memory or the like having an application program stored therein and executing the application program, an SDRAM 29 for storing data on a processing result of the application program and the like, and further the LCD display screen 23 and operation keys 22 also shown in FIG. 1.

Figure 3:
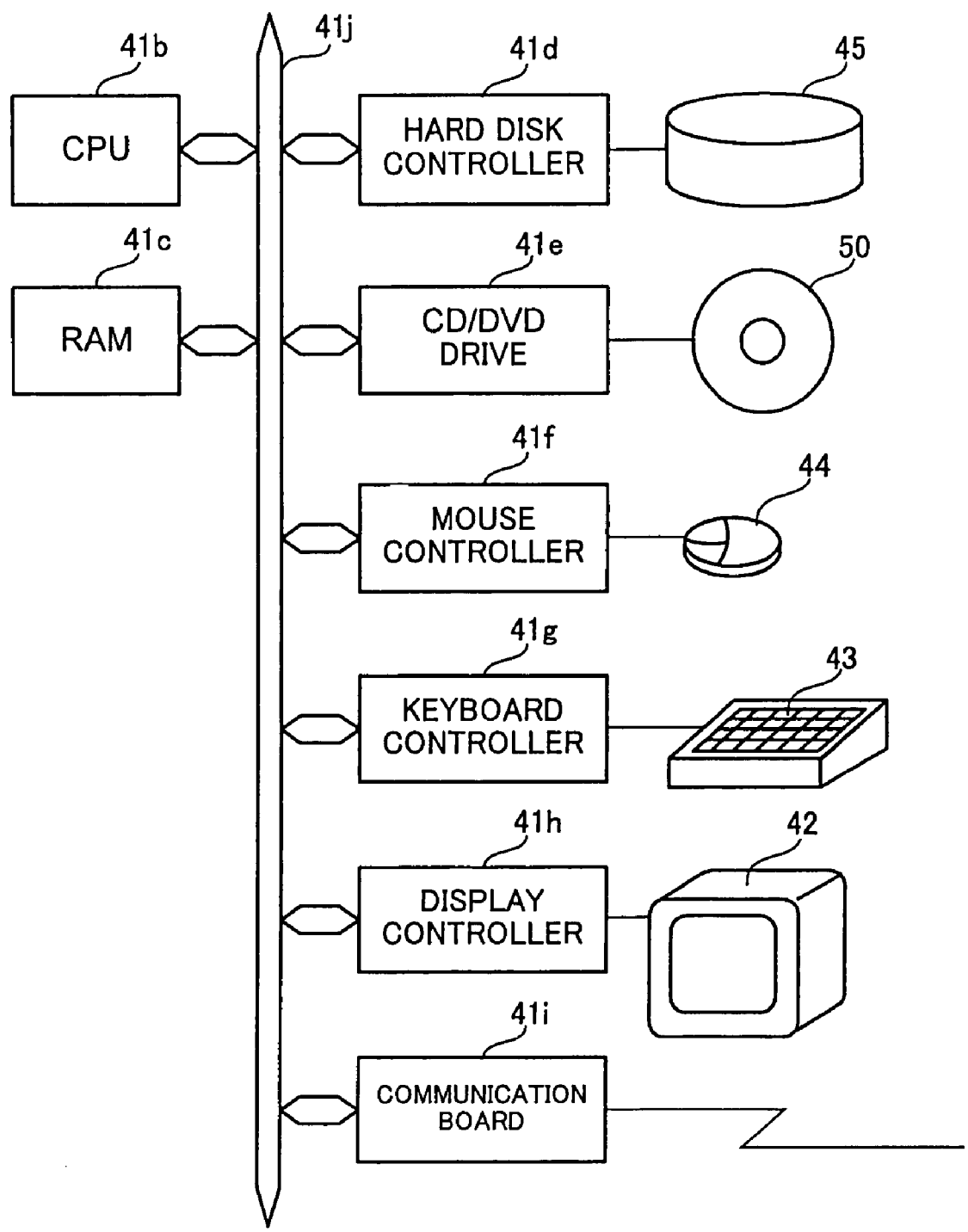
FIG. 3 is a hardware configuration diagram of a computer operating as a mail server of which appearance is shown in FIG. 1.

FIG. 3 is a hardware configuration diagram of the computer operating as the mail server of which appearance is shown in FIG. 1.

The hardware configuration diagram of FIG. 3 shows a CPU 41b, a RAM 41c, a hard disk controller 41d, a CD/DVD drive 41e, a mouse controller 41f, a keyboard controller 41g, a display controller 41h and a communication board 41i, which are mutually connected by a bus 41j.

As described with reference to FIG. 1, the CD/DVD drive 41e accesses the CD 50 and DVD (not shown) loaded from the CD/DVD loading gate 41a. The communication board 41i transmits and receives a mail for mediation of e-mails transmitted and received between the two cell-phones 10 and 20 shown in FIG. 1.

FIG. 3 also shows a hard disk 45 accessed by the hard disk controller 41d, the mouse 44 controlled by the mouse controller 41f, the keyboard 43 controlled by the keyboard controller 41g, and the display 42 controlled by the display controller 41h.

Figure 4:
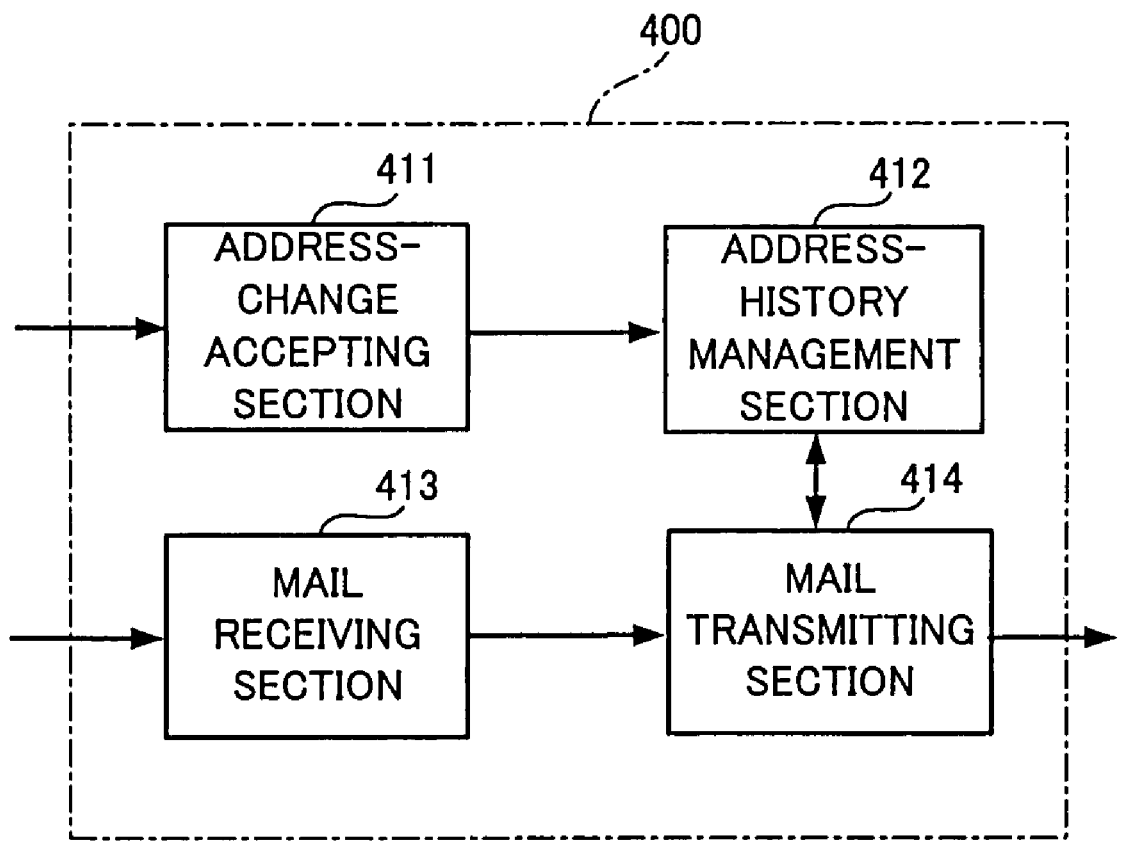
FIG. 4 is a functional block diagram showing functions of the mail server.

FIG. 4 is a functional block diagram showing the functions of the mail server. The functions described here are the functions which are realized by executing a mail server program 420 (refer to FIG. 6) described later in the computer 40 shown in FIGS. 1 and 3.

A mail server 400 shown in FIG. 4 includes an address-change accepting section 411, an address-history management section 412, a mail receiving section 413 and a mail transmitting section 414.

Here, the address-change accepting section 411 as a function of accepting a change of a mail address of a user device (the two cell-phones 10 and 20 in the example shown in FIG. 1). The address-history management section 412 has a function of managing history of the mail addresses of the user device. The mail receiving section 413 has a function of receiving a mail destined for a destination device from a transmission origin device. The mail transmitting section 414 has a function of attaching the history of mail addresses of the transmission origin device to the received mail and transmitting the mail having the history attached thereto to the destination device. Here, the address-history management section 412 manages the history of the mail addresses of the user device, that is, a first mail address and all the mail addresses changed thereafter of the user device. And the mail transmitting section 414 attaches, to a mail to be transmitted to the destination device, all the history of mail addresses of the transmission origin device of the mail managed by the address-history management section 412 and transmits the mail having the history attached thereto to the destination device.

However, it is also possible to adopt a configuration in which the address-history management section 412 manages the history of the mail addresses of the user device up to a mail address tracked back by a predetermined or larger number of times of change, and the mail transmitting section 414 attaches the history to the mail transmitted to the destination device, that is, up to the history of the mail addresses tracked back by the predetermined number of times of change out of the history of mail addresses of the transmission origin device of the mail managed by the address-history management section 412, and transmits the mail having the history attached thereto to the destination device.

A more concrete example of the function of the mail server 400 will be described later.

Figure 5:
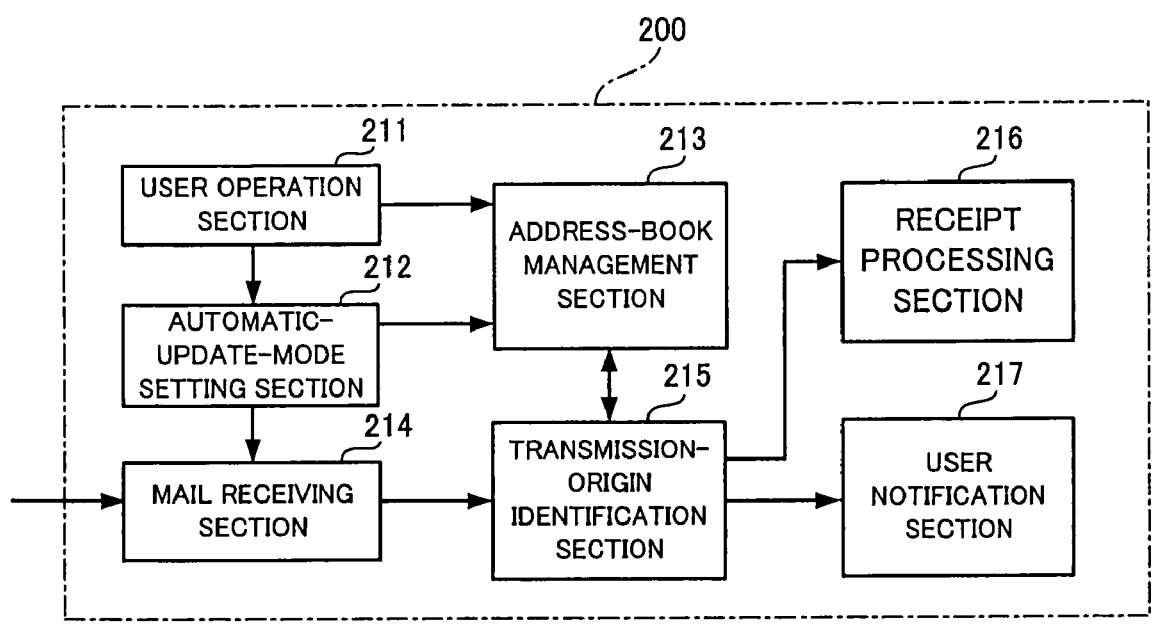
FIG. 5 is a functional block diagram showing the functions of the cell-phone shown in FIG. 1 as a mail reception device.

FIG. 5 is a functional block diagram showing the functions of each of the two cell-phones (cell-phone 20 here) shown in FIG. 1 as the mail reception device.

A mail reception device 200 described here is a function to be realized within the cell-phone 20 by executing a mail reception program 220 (refer to FIG. 7) described later in the application section 28 (refer to FIG. 2) of the cell-phone 20 shown in FIGS. 1 and 2.

The mail reception device 200 shown in FIG. 5 includes a user operation section 211, an automatic-update-mode setting section 212, an address-book management section 213, a mail receiving section 214, a transmission-origin identification section 215, a receipt processing section 216 and a user notification section 217.

The user operation section 211 is equivalent to the operation keys 22 of the cell-phone 20 shown in FIGS. 1 and 2 in terms of hardware, and is intended to input various kinds of instructions described later to the mail reception device 200 according to a user operation.

The automatic-update-mode setting section 212 will be described later.

The address-book management section 213 has a function of managing the mail address list of the user device created in the mail reception device 200 based on a will of the user of the mail reception device 200.

The mail receiving section 214 receives the mail having the history of the mail addresses of the transmission origin device attached thereto and transmitted from the mail transmitting section 414 of the mail server 400 shown in FIG. 4.

If the mail receiving section 214 receives the mail having the history of the mail addresses attached thereto, the transmission-origin identification section 215 checks the mail address recorded in the history attached to the mail received by the mail receiving section 214 against the mail addresses managed by the address-book management section 213 so as to recognize the transmission origin device of the mail. Here, as for the check, the transmission-origin identification section 215 checks the mail addresses recorded in the history attached to the mail received by the mail receiving section 214 against the mail addresses managed by the address-book management section 213 in the order tracked back from a current mail address to past mail addresses. It is because the mail addresses are unchanged more often than not and processing of the check can be performed in a shorter time this way.

The receipt processing section 216 performs receipt processing according to the transmission origin device after the transmission origin device is recognized by the transmission-origin identification section 215. The receipt processing according to the transmission origin device is processing such as displaying a name or a nickname of the user of the mail address upon reception in the case where the name or nickname is registered with the address book correspondingly to the mail address or outputting a sound in the case where the mail address in the address book is associated with a specific sound. The receipt processing according to the transmission-origin device itself is already a heretofore known function, and so a further detailed description will be omitted.

In the case where the transmission-origin identification section 215 has recognized the transmission origin device of the mail received by the mail receiving section 214 based on the past mail addresses of the transmission origin device, the user notification section 217 notifies the user that the transmission origin device of the mail has been recognized based on the past mail addresses. In this embodiment, this notification is performed by displaying a phrase of "there is address update information" (refer to FIG. 12) on the display screen 23 (refer to FIGS. 1 and 2). In addition, the notification may also be displayed in a design or performed by a sound instead of displaying it in such characters. In this embodiment, in the case where the transmission-origin identification section 215 has recognized the transmission origin device of the mail received by the mail receiving section 214 based on the past mail addresses of the transmission origin device, the user notification section 217 notifies the user that the transmission origin device of the mail has been recognized based on the past mail addresses when receiving the mail, when opening the mail by the user operation, and when displaying the mail addresses of the transmission origin device managed by the address-book management section 213.

In the case where the transmission origin device has been recognized based on the past mail addresses of the transmission origin device, the automatic-update-mode setting section 212 sets up and releases an automatic update mode for automatically updating the past mail address of the transmission origin device managed by the address-book management section to the current mail address of the transmission origin device following the user operation of setup and release from the user operation section 211 respectively.

In the case where the automatic update mode is set up, the address-book management section 213 updates the past mail address of the transmission origin device managed by the address-book management section 213 to the current mail address of the transmission origin device without waiting for the user operation after the transmission-origin identification section 215 recognizes the transmission origin device of the mail received by the mail receiving section 214 based on the past mail addresses of the transmission origin device.

Furthermore, the address-book management section 213 restores the mail address automatically updated in the automatic update mode to the mail address before the update following a cancel operation by the user from the user operation section 211. This function is helpful in preventing an unauthorized update by a junk mail assuming a transmission origin mail address.

In the case where the automatic update mode is yet to be set and the transmission-origin identification section 215 recognizes the transmission origin device of the mail received by the mail receiving section 214 based on the past mail addresses of the transmission origin device, the address-book management section 213 updates the past mail address of the transmission origin device managed by the address-book management section 213 to the current mail address of the transmission origin device following an update operation by the user of the user operation section 211.

A concrete example of the mail reception device 200 shown in FIG. 5 will be described later.

Figure 6:
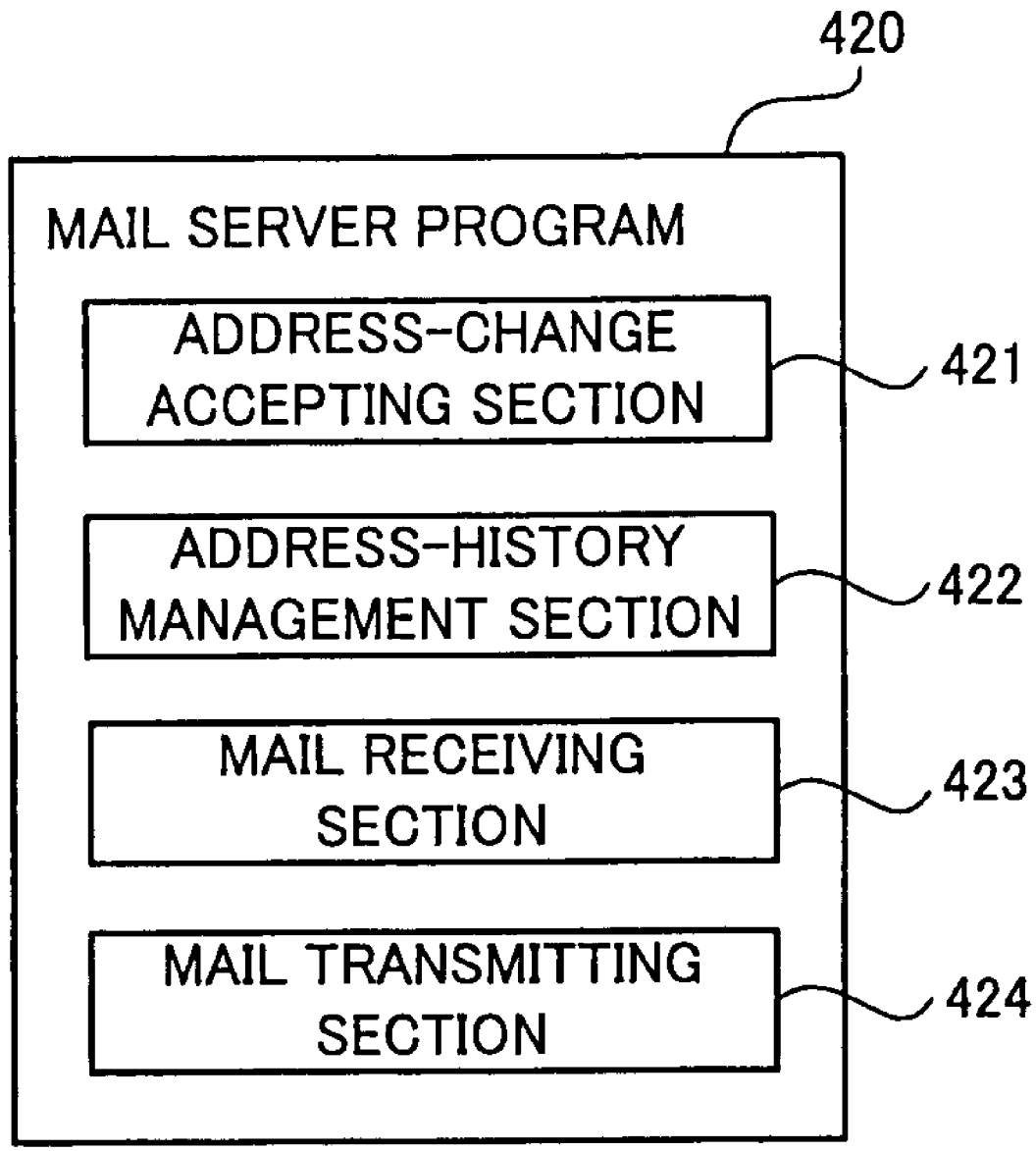
FIG. 6 is a diagram showing an overview of a mail server program executed in the computer shown in FIGS. 1 and 3.

FIG. 6 is a diagram showing an overview of the mail server program executed in the mail server 40 shown in FIGS. 1 and 3.

The mail server program 420 shown in FIG. 6 is a program for operating the computer 40 shown in FIGS. 1 and 3 as the mail server 400 described with reference to FIG. 4, and includes an address-change accepting section 421, an address-history management section 422, a mail receiving section 423 and a mail transmitting section 424. The address-change accepting section 421, address-history management section 422, mail receiving section 423 and mail transmitting section 424 are program components for providing the computer 40 shown in FIGS. 1 and 3 with the functions as the address-change accepting section 411 address-history management section 412, mail receiving section 413 and mail transmitting section 414 constituting the mail server 400 shown in FIG. 4 respectively. Operations of these program components when executed in the computer 40 shown in FIGS. 1 and 3 are the same as the functions of functional blocks as the mail server 400 shown in FIG. 4, and so an overlapping description thereof will be omitted here.

Figure 7:
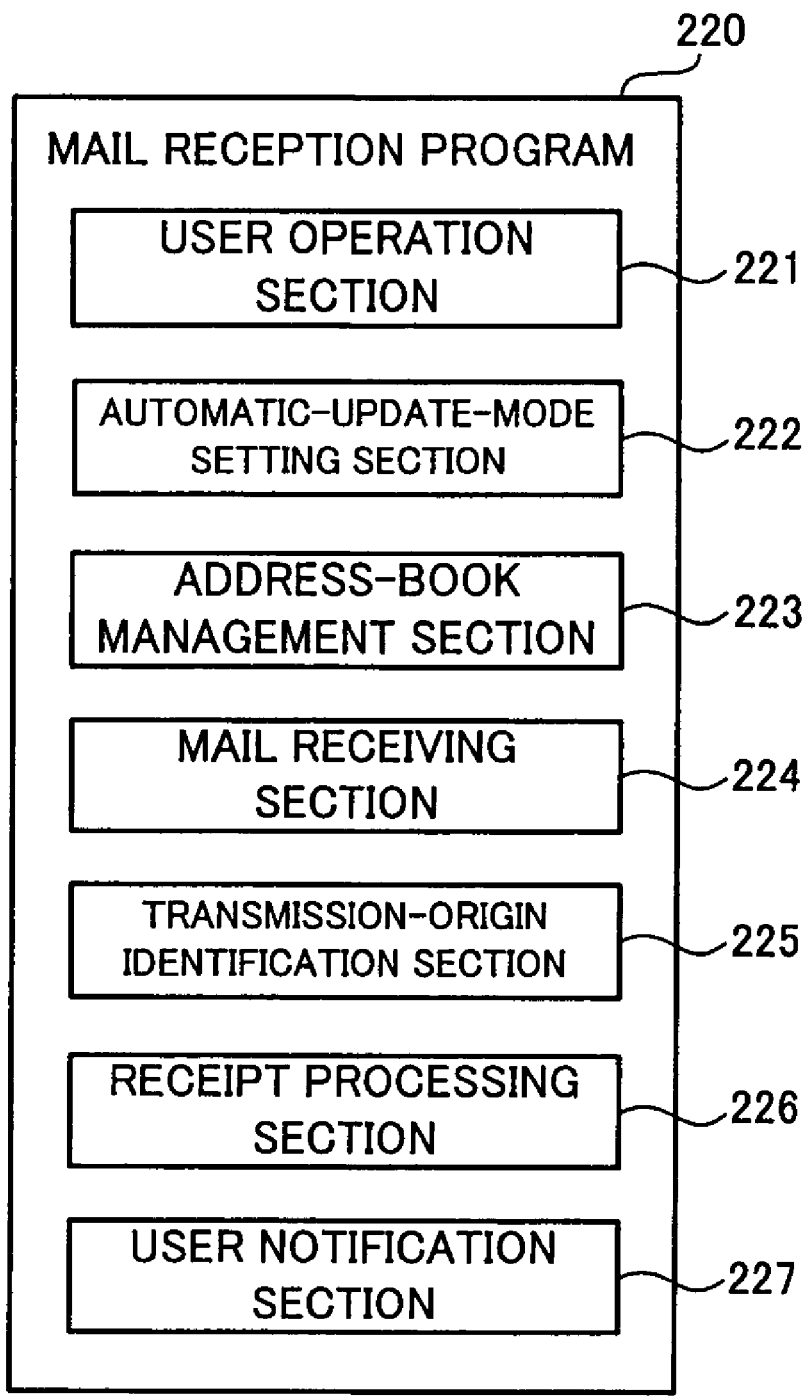
FIG. 7 is a diagram showing an overview of a mail reception program which is executed in an application section of the cell-phone shown in FIGS. 1 and 2 and provides the cell-phone with the functions as the mail reception device described with reference to FIG. 5.

FIG. 7 is a diagram showing an overview of a mail reception program which is executed in an application section 28 (refer to FIG. 2) of the cell-phone 20 shown in FIGS. 1 and 2 and provides the cell-phone 20 with the functions as the mail reception device 200 described with reference to FIG. 5.

The mail reception program 220 shown in FIG. 7 is composed of the program components of a user operation section 221, an automatic-update-mode setting section 222, an address-book management section 223, a mail receiving section 224, a transmission-origin identification section 225, a receipt processing section 226 and a user notification section 227.

The user operation section 221, automatic-update-mode setting section 222, address-book management section 223, mail receiving section 224, transmission-origin identification section 225, receipt processing section 226 and user notification section 227, which are the program components, are the program components for, when executed in the cell-phone 20 shown in FIGS. 1 and 2, providing the cell-phone 20 with the functions of the corresponding functional blocks described with reference to FIG. 5, that is, the user operation section 211, automatic-update-mode setting section 212, address-book management section 213, mail receiving section 214, transmission-origin identification section 215, receipt processing section 216 and user notification section 217. Operations of these program components when executed in the cell-phone 20 shown in FIGS. 1 and 2 are the same as the functions of the functional blocks of the mail reception device 200 shown in FIG. 5, and so an overlapping description thereof will be omitted here.

Figure 8:
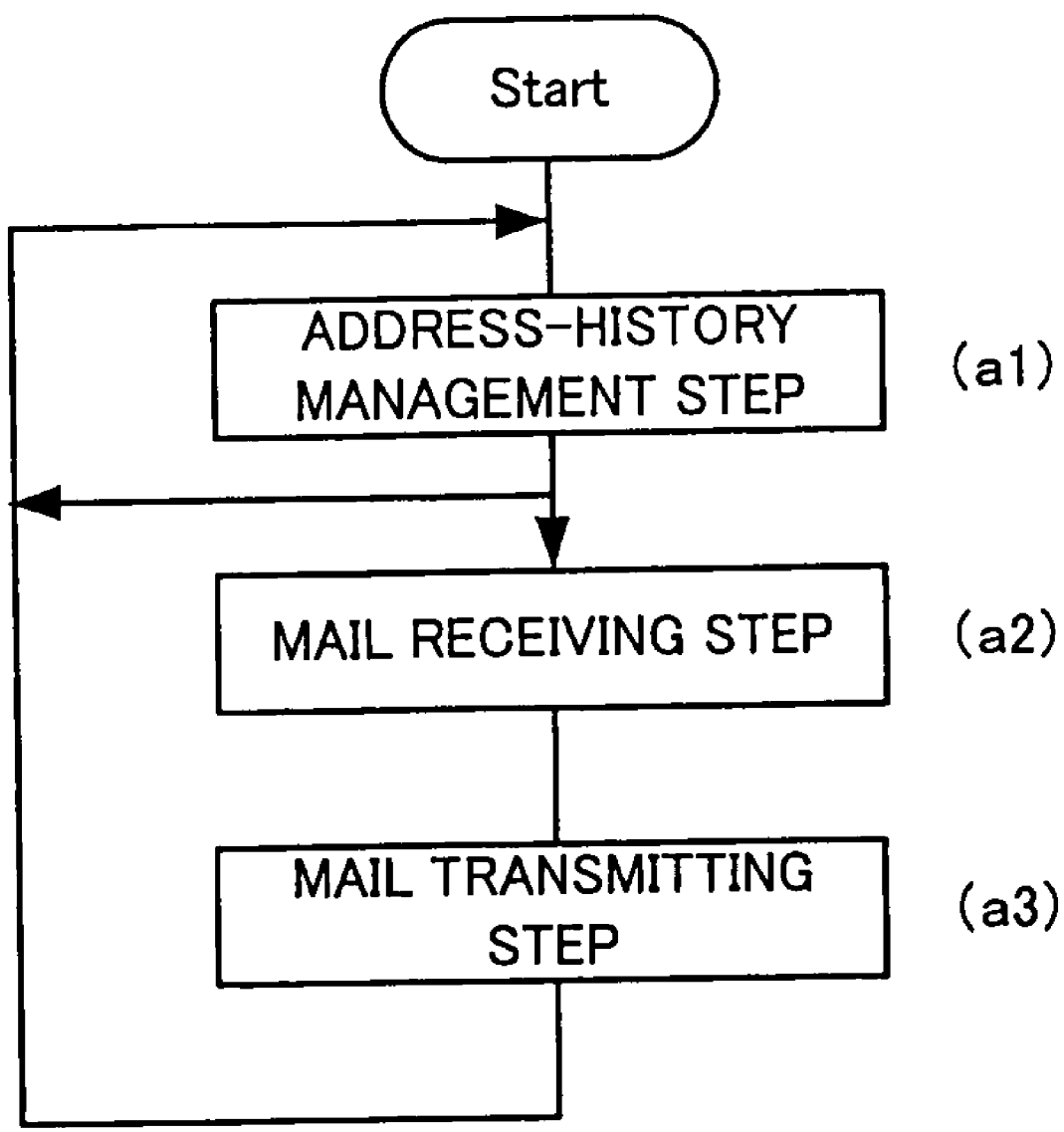
FIG. 8 is a flowchart showing an overview of a mail mediation method implemented by using the computer shown in FIGS. 1 and 3.

FIG. 8 is a flowchart showing an overview of a mail mediation method implemented by using the computer shown in FIGS. 1 and 3.

The mail mediation method shown in FIG. 8 includes an address-history management step a1, a mail receiving step a2 and a mail transmitting step a3.

The address-history management step a1 is a step of accepting a change of the mail address of the user device and managing the history of the mail addresses of the user device, which is equivalent to a combination of the address-change accepting section 411 and address-history management section 412 of the mail server 400 shown in FIG. 4.

The mail receiving step a2 is a step of receiving a mail to the destination device from the transmission origin device, which is equivalent to the mail receiving section 413 shown in FIG. 4. The mail transmitting step a3 is a step of attaching the history of mail addresses of the transmission origin device to the received mail and transmitting the mail having the history attached thereto to the destination device, which is equivalent to the mail transmitting section 414 shown in FIG. 4.

Here, according to this embodiment, the address-history management step a1 manages the history of the mail addresses of the user device, that is, the first mail address and all the mail addresses changed thereafter of the user device. And the mail transmitting step a3 attaches, to a mail to be transmitted to the destination device, all the history of mail addresses of the transmission origin device of the mail managed by the address-history management step a1 and transmits the mail having the history attached thereto to the destination device.

It is also possible to have a configuration in which the address-history management step a1 is a step which manages the history of the mail addresses of the user device up to a mail address tracked back by a predetermined or larger number of times of change, and the mail transmitting step a3 is a step which attaches, to a mail to be transmitted to the destination device, up to the history of the mail addresses tracked back by the predetermined number of times of change out of the history of mail addresses of the transmission origin device of the mail managed by the address-history management step a1 and transmits the mail having the history attached thereto to the destination device.

According to this embodiment, acceptance of the change of the mail addresses and management of the mail addresses are usually performed by the address-history management step a1. If a mail is transmitted from the device, the mail is received (step a2) and has the history of mail addresses of the transmission origin device attached thereto so as to transmit the mail having the history attached thereto to the destination device (step a3).

Figure 9:
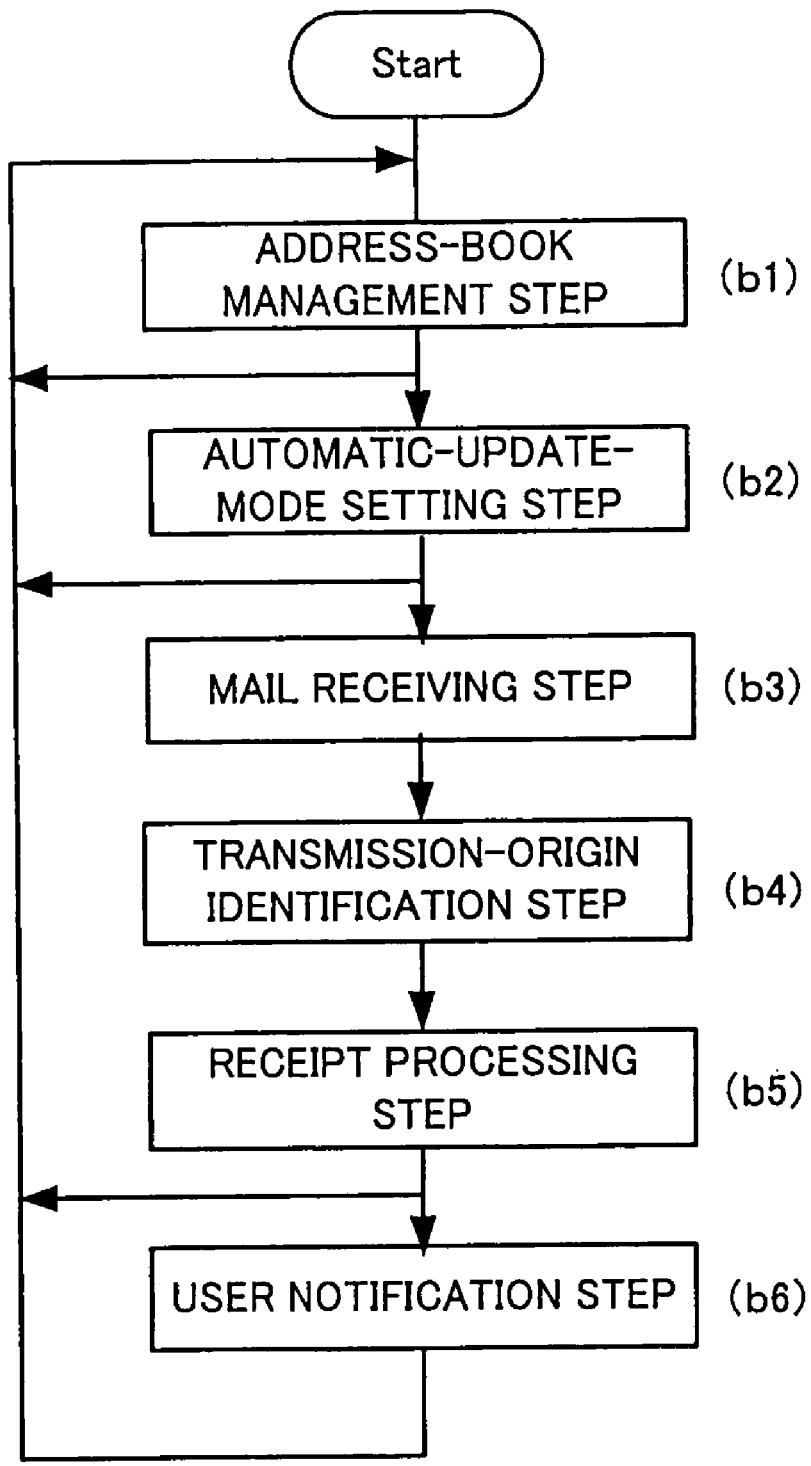
FIG. 9 is a flowchart showing an overview of a mail reception method implemented by using the cell-phone shown in FIGS. 1 and 2.

FIG. 9 is a flowchart showing an overview of the mail reception method implemented by using the cell-phone shown in FIGS. 1 and 2.

The mail reception method shown in FIG. 9 includes an address-book management step b1, an automatic-update-mode setting step b2, a mail receiving step b3, a transmission-origin identification step b4, a receipt processing step b5 and a user notification step b6.

In the address-book management step b1, a mail address list of the user devices which may exchange the mails with the cell-phone is managed.

The automatic-update-mode setting step b2 is a step which sets up and releases the automatic update mode for automatically updating the past mail address of the transmission origin device managed by the address-book management step b1 to the current mail address of the transmission origin device following a user operation of setup and release respectively in the case where the transmission origin device is recognized based on the past mail addresses of the transmission origin device. The mail receiving step b3 is a step which receives the mail having the history of mail addresses of the transmission origin device attached thereto. And the transmission-origin identification step b4 is a step which recognizes the transmission origin device of the mail received by the mail receiving step b3 by checking the mail address recorded in the history attached to the mail against the mail address managed by the address-book management step b1. The transmission-origin identification step b4 checks the mail addresses recorded in the history attached to the mail received by the mail receiving step b3 against the mail addresses managed by the address-book management step b1 in the order tracking back from the current mail address to the past mail addresses.

The receipt processing step b5 performs receipt processing according to the transmission origin device after the transmission origin device is recognized by the transmission-origin identification step b4.

Furthermore, the user notification step b6 is a user notification step which notifies the user that the transmission origin device has been recognized based on the past mail addresses in the case where the transmission origin device of the mail received by the mail receiving step b3 has been recognized by the transmission-origin identification step b4 based on the past mail addresses of the transmission origin device.

Here, in the user notification step b6, the user is notified that the transmission origin device of the mail received by the mail receiving step b3 has been recognized by the transmission-origin identification step b4 based on the past mail addresses of the transmission origin device when receiving the mail, when opening the mail by the user operation, and when displaying the mail addresses of the transmission origin device managed by the address-book management step b1 by the user operation.

In the address-book management step b1, in the case where the automatic update mode is set, the past mail address of the transmission origin device managed by the address-book management step b1 is updated to the current mail address of the transmission origin device without waiting for the user operation after the transmission origin device of the mail received by the mail receiving step b3 is recognized by the transmission-origin identification step b4 based on the past mail addresses of the transmission origin device. In the address-book management step b1, the mail address automatically updated in the automatic update mode is restored to the mail address before the update following a cancel operation by the user.

Furthermore, in the address-book management step b1, in the case where the automatic update mode is yet to be set and the transmission origin device of the mail received by the mail receiving section 214 is recognized by the transmission-origin identification step b4 based on the past mail addresses of the transmission origin device, the past mail address of the transmission origin device managed by the address-book management step b1 is updated to the current mail address of the transmission origin device following an update operation by the user.

The following will describe a more concrete embodiment of the present invention.

Figure 10:
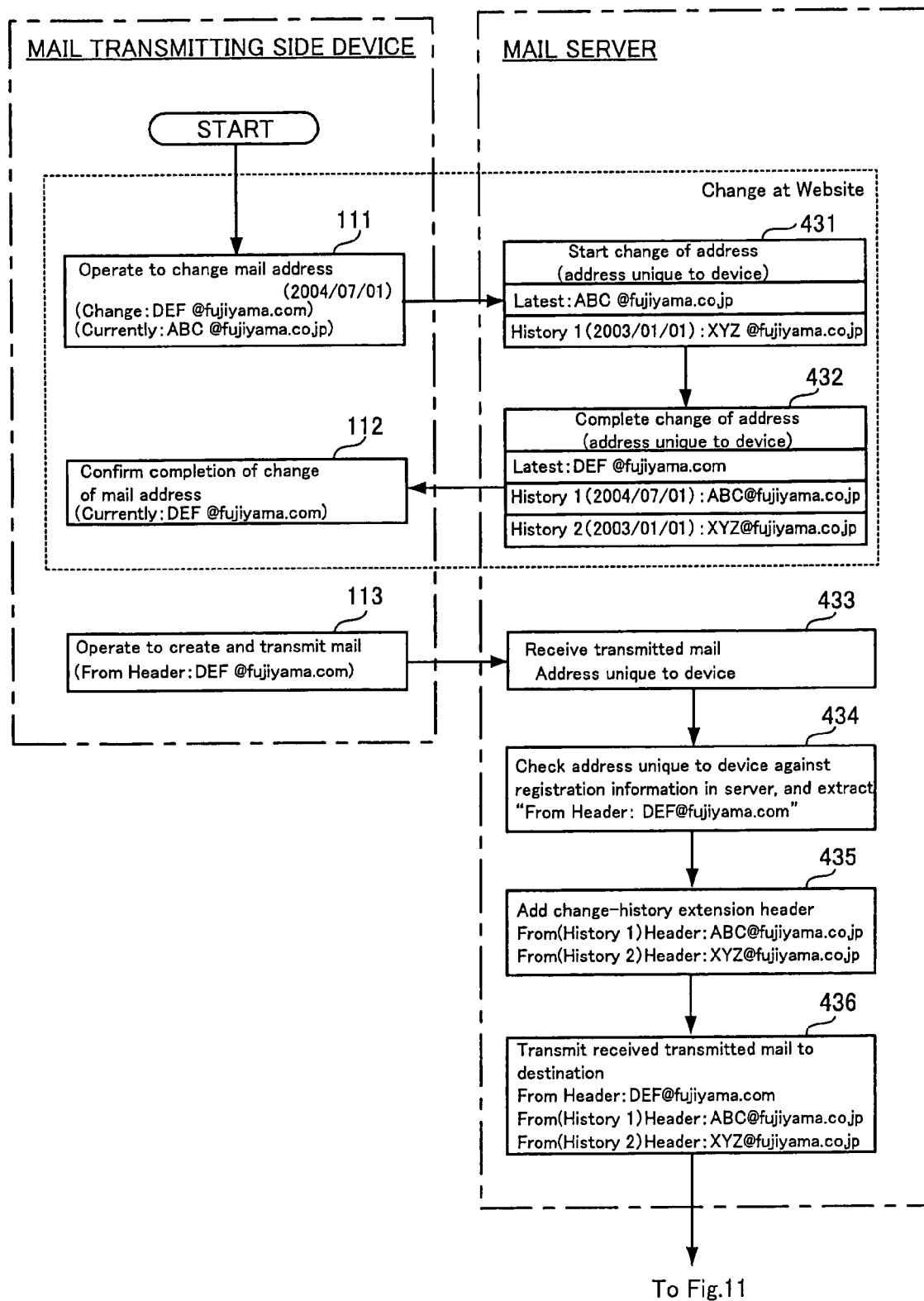
FIG. 10 is a diagram showing processing of a mail transmission side device and the mail server.

FIG. 10 is a diagram showing processing of a mail transmission side device and the mail server.

Here, the mail transmission side device shown in FIG. 10 is the cell-phone 10 of the two cell-phones 10 and 20 shown in FIG. 1 for instance, and the mail server shown in FIG. 10 is the computer 40 shown in FIG. 1.

The mail transmission side device has a "device unique address" which is unique to the mail transmission side device. The mail transmission side device currently has a mail address of "ABC@fujiyama.co.jp". Here, the user of the mail transmission side device performed a mail address change operation for changing the mail address "ABC@fujiyama.co.jp" to "DEF@fujiyama.com" on Jul. 1, 2004 (step 111). Information on this mail address change is passed on to the mail server on the Web site. On the mail sever, the history of the mail addresses of the mail transmission side device is managed by associating the latest mail address "ABC@fujiyama.co.jp" which has been used so far and a mail address "XYZ@fujiyama.co.jp" which was changed once in the past (Jan. 1, 2003) and is immediately preceding "ABC@fujiyama.co.jp" with the "device unique address" of the mail transmission side device (step 431). Upon receipt of the information from the mail transmission side device to the effect that the mail address is changed from "ABC@fujiyama.co.jp" to "DEF@fujiyama.com",the mail addresses are managed by associating the latest mail address "DEF@fujiyama.com", "history 1 (Jul. 1, 2004): ABC@fujiyama.co.jp" and a mail address "history 2 (Jan. 1, 2003): XYZ@fujiyama.co.jp" with the "device unique address" instead of the history information managed so far (step 432). Then, a notice is given to the mail transmission side device on the Web site to the effect that the change of the mail address to "DEF@fujiyama.com" has been completed, and completion of the change of the mail address is confirmed by the mail transmission side device (step 112). Thus, the mail address of the mail transmission side device becomes "DEF@fujiyama.com", and "DEFfujiyama.com" is used by the mail transmission side device thereafter as the mail address of the mail transmission side device.

Thereafter, a mail is created and transmitted by the mail transmission side device (step 113). The mail has the device unique address of the mail transmission side device attached thereto, and "DEF@fujiyama.com" is written to a From header (a header on which the mail address of the transmission origin is recorded), which is then transmitted to the mail server.

The mail server receives the transmitted mail and recognizes the device unique address of the transmission origin of the mail (step 433), and extracts the same mail address as the From header: DEF@fujiyama.com" (step 434) from registration information in the mail server by checking the device unique address against the registration information in the mail server so as to add an extension header on which the history of the change of mail addresses is recorded to the mail received in step 433 (step 435). In the example shown here, From (history 1) header: ABC@fujiyama.co.jp and From (history 2) header: XYZ@fujiyama.co.jp are added as the extension headers in this extension header adding process.

After performing such an extension header adding process (step 435), a transmitted mail which was received in step 433 and had the extension header added thereto is transmitted to a destination of the mail (step 436). The mail transmitted to this destination has the From header DEF@fujiyama.com, From (history 1) header: ABC@fujiyama.co.jp and From (history 2) header: XYZ@fujiyama.co.jp attached thereto.

Figure 11:
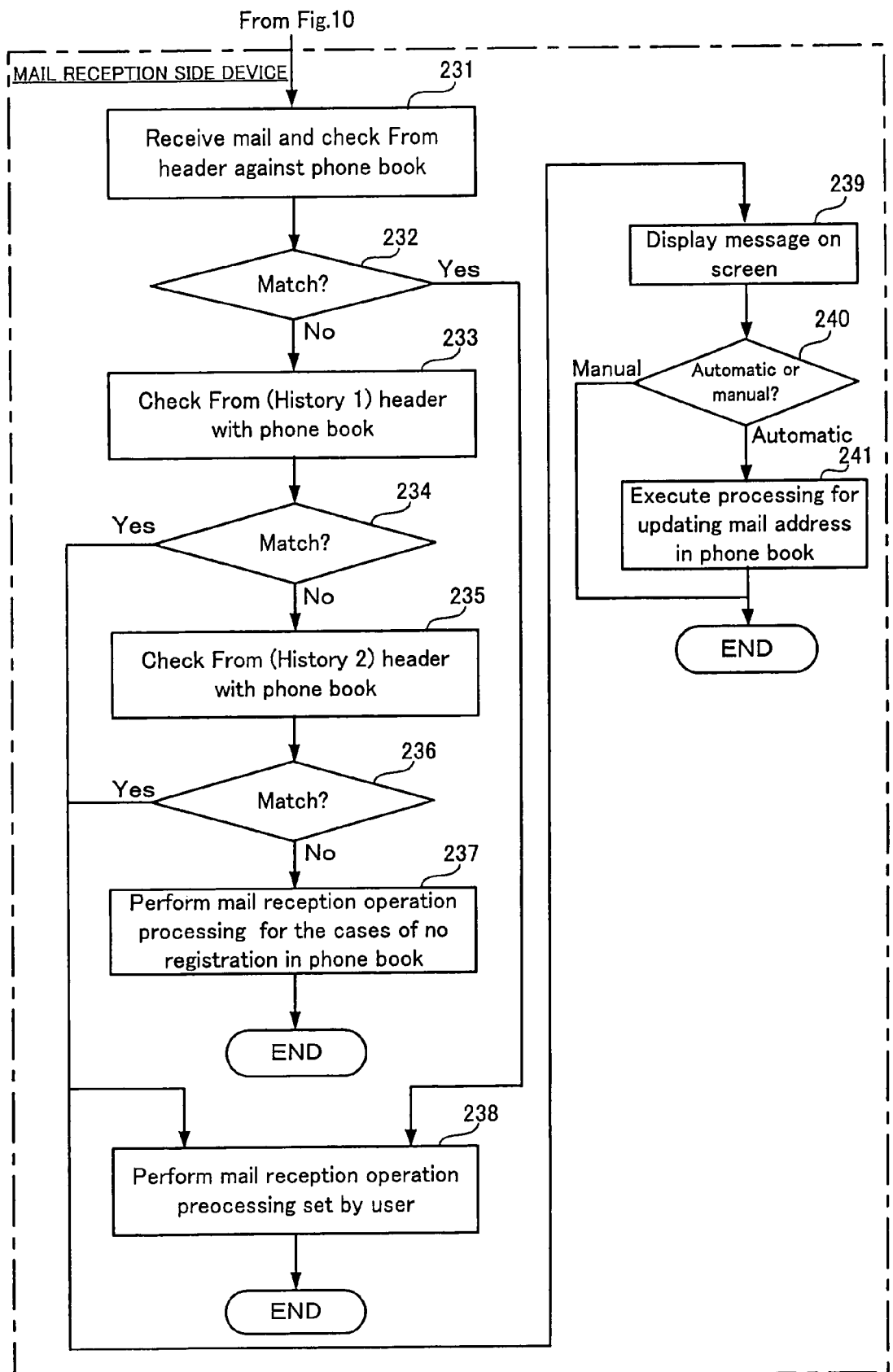
FIG. 11 is a diagram showing processing of a mail reception side device on receiving a mail transmitted from the mail server.

FIG. 11 is a diagram showing the processing of a mail reception side device on receiving the mail transmitted from the mail server. The mail reception side device shown in FIG. 11 is the cell-phone 20 of the two cell-phones 10 and 20 shown in FIG. 1 for instance.

On the mail reception side device, receipt processing of the mail having the From header, From (history 1) header and From (history 2) header attached thereto shown in step 436 of FIG. 8 is performed. First, the From header is checked against a phone book (mail address is registered together with a telephone number of the other party) of the mail reception side device (step 231). In the checking process here, it is examined whether or not the same mail address as the From header: DEF@fujiyama.com is registered with the phone book. When the mail address "DEF@fujiyama.com" exists in the phone book, the checking process about the From (history 1) header and From (history 2) header is not necessary, and so the procedure directly moves on to step 238. In step 238, the process for performing a mail reception operation which is preset by the user is performed. Here, the process refers to a mail reception operation associated with the mail address, such as displaying the other party's user name when the mail address is associated with that user name or sounding a specific melody when that melody is associated.

If it is determined in step 232 that no mail address matching the From header: DEF@fujiyama.com is registered with the phone book, then the From (history 1) header: ABC@fujiyama.co.jp is checked against the mail addresses registered with the phone book. If there is a match (step 234), the procedure moves on to the step 238 and further moves on to step 239 described later.

In the case where no mail address matching the From (history 1) header: ABC@fujiyama.co.jp is found in the phone book (step 234), the checking process is further performed likewise as to From (history 2) header: XYZ@fujiyama.co.jp (step 235). If there is a match (step 236), the procedure moves on to the step 238 and further moves on to step 239 described below. When there is still no matching mail address in the phone book (step 236), a mail reception operation process for the cases of no registration with the phone book is performed (step 237).

In step 239, after finishing the mail reception operation process of step 238, a message screen is displayed, representing that there is a matching past mail address (From (history 1) header: ABC@fujiyama.co.jp or From (history 2) header: XYZ@fujiyama.co.jp in the example shown here) in the phone book and prompting an update of the mail address.

Figure 12:
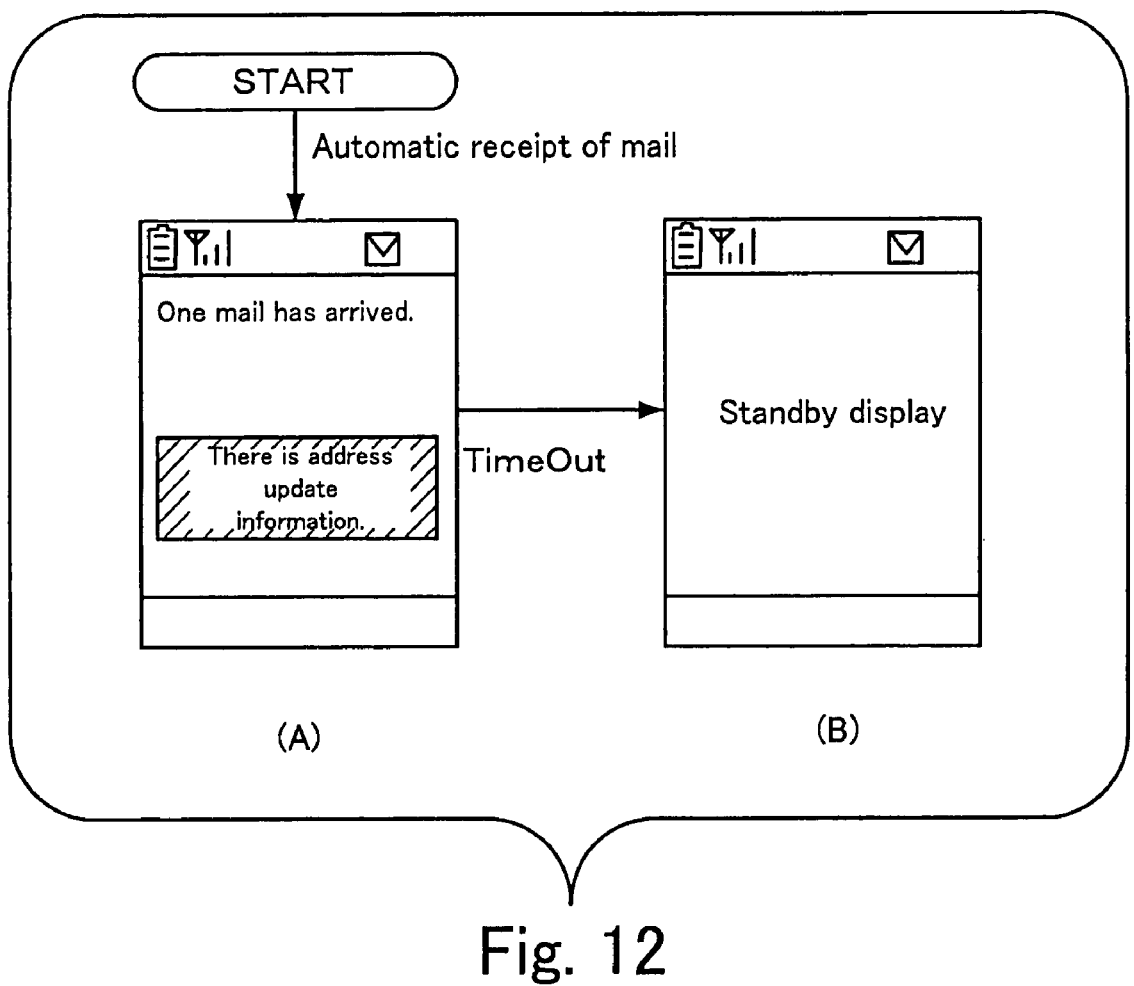
FIG. 12 is a diagram showing a message screen.

FIG. 12 are diagrams showing the message screen.

Here, as shown in part (A) of FIG. 12, a message of "there is address update information" is displayed in addition to existence of the received mails, and a normal standby display is restored after a predetermined time as shown in part (B) of FIG. 12.

Figure 13:
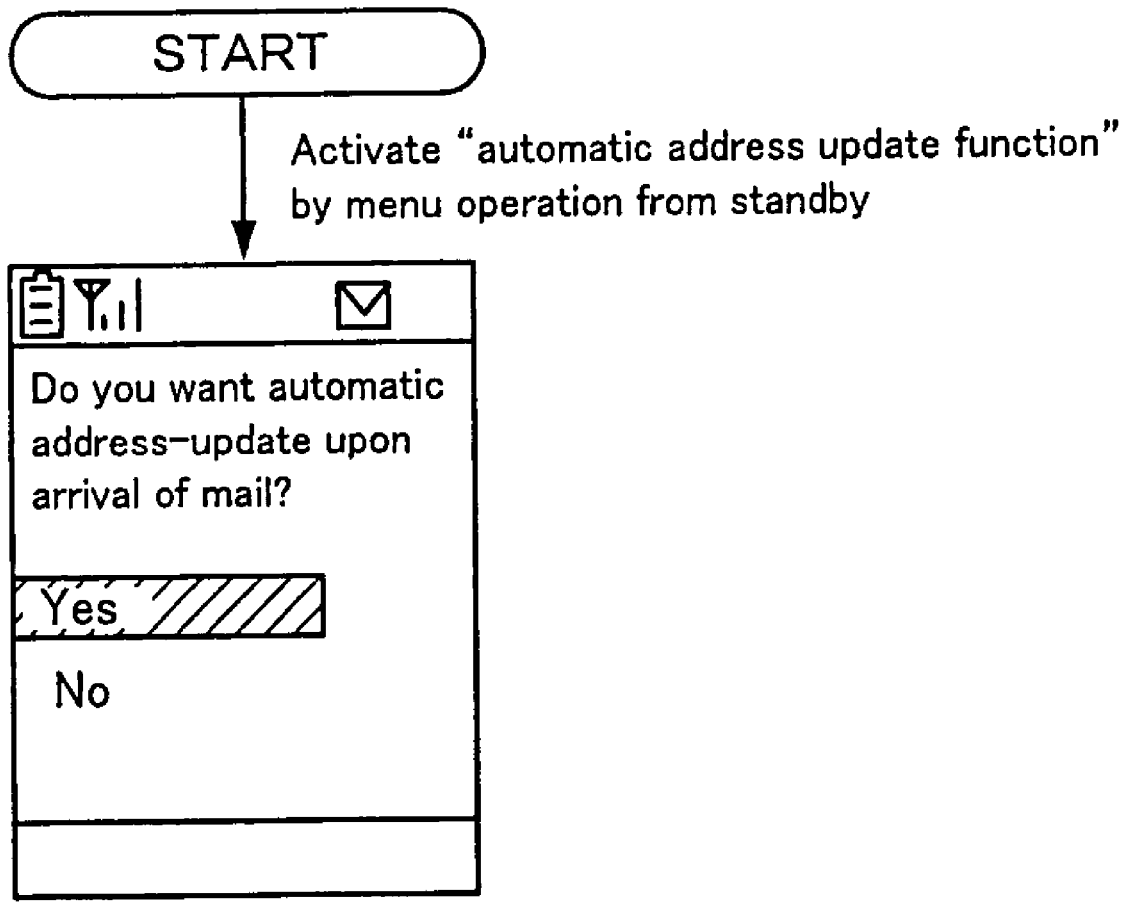
FIG. 13 is a diagram showing a setting screen of whether or not to automatically update a mail address.

FIG. 13 is a diagram showing a setting screen of whether or not to automatically update the mail address.

If an "automatic address update function" is activated by a menu operation from the standby display, the screen shown in FIG. 13 opens, and the automatic update mode of the mail address can be set and released.

The description is continued by returning to FIG. 11.

In step 240, it is determined whether or not the automatic update mode of the mail address is set. If the automatic update mode is set, the update process is performed from the mail address ABC@fujiyama.co.jp registered with the phone book till then to the new mail address DEF@fujiyama.com without waiting for the user operation (step 241).

When the automatic update mode is not set, the mail address can be manually updated. This process will be described later.

Figure 14:
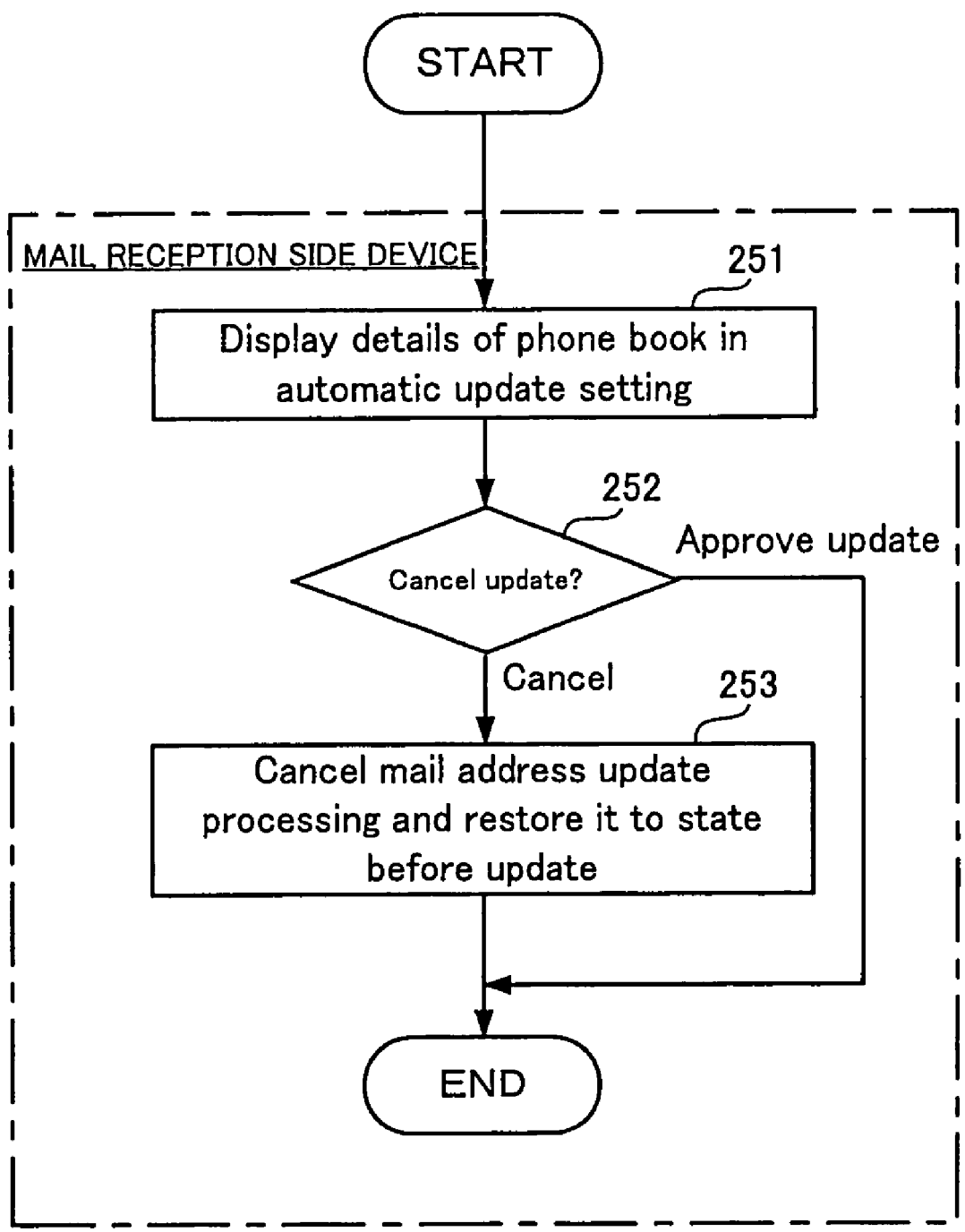
FIG. 14 is a flowchart representing the processing on canceling an automatically updated mail address.
Figure 15:
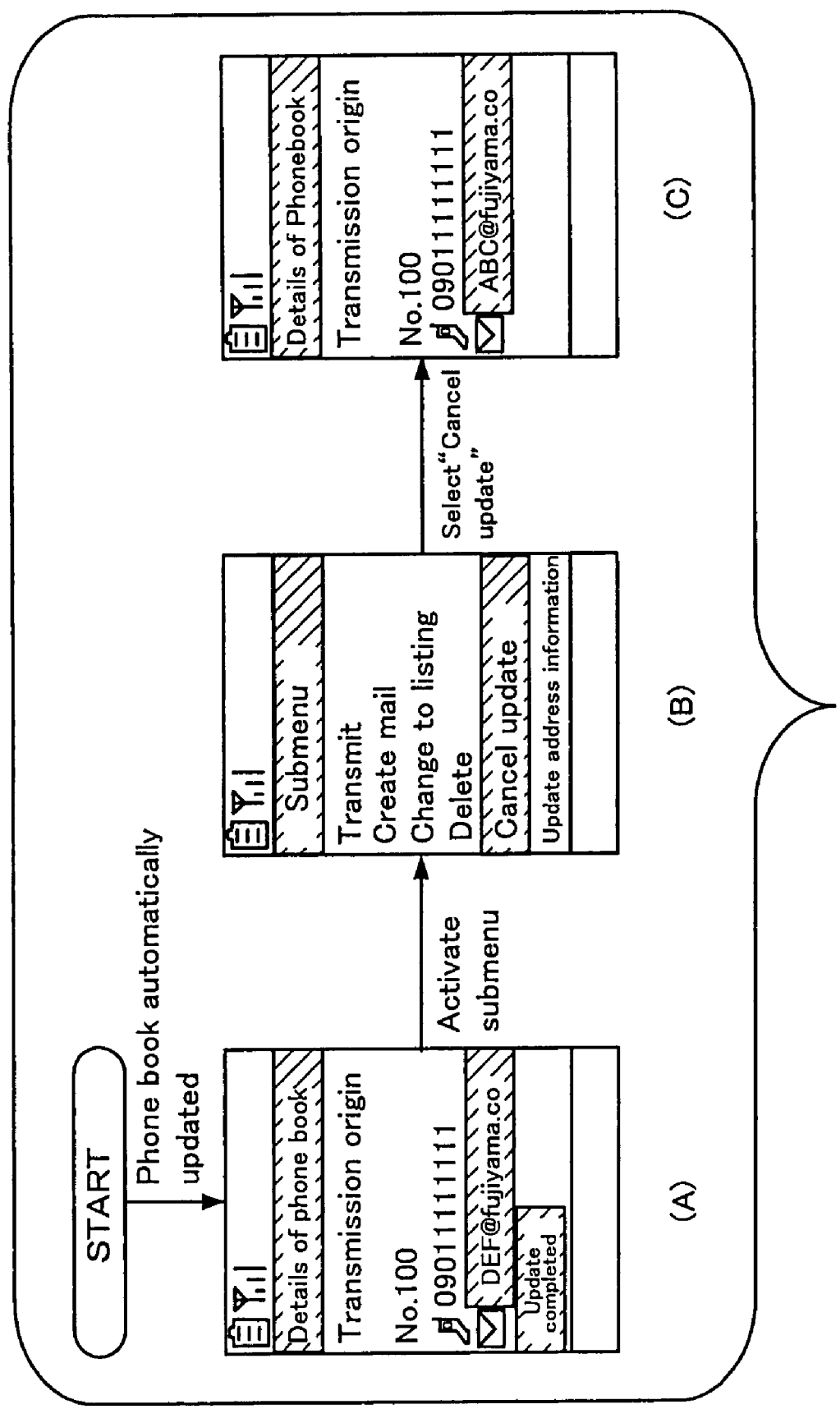
FIG. 15 is a diagram showing display screens in that case.

FIG. 14 is a flowchart representing the processing on canceling the automatically updated mail address. FIG. 15 are diagrams showing the display screen in that case.

Here, details of the phone book automatically updated in the automatic update mode are displayed (step 251 of FIG. 14, part (A) of FIG. 15) by the menu operation from the standby display or pushing a decision button when the screen of part (A) of FIG. 12 is displayed. Following a submenu activating operation, the screen of part (B) of FIG. 15 is displayed so as to select the process of either cancellation or approval of the update. When a cancellation process is selected (step 252 of FIG. 14), the update of the mail address is cancelled and restored to the mail address before the update (step 253 of FIG. 14, part (C) of FIG. 15).

Here, the "Transmission Origin" and the like in part (A) of FIG. 15 and other drawings are concrete names, nicknames and the like registered as the transmission origins of this time, which are represented here by the name "Transmission Origin" and the like. This also applies to the drawings described below.

Thus, it is possible, in this configuration, to cancel the update here by storing the mail address before the automatic update of the mail address in the automatic update mode even after the update. It is thereby possible for the user to control the update of the mail address even in the automatic update mode and prevent falsification of the mail address by the junk mail.

Figure 16:
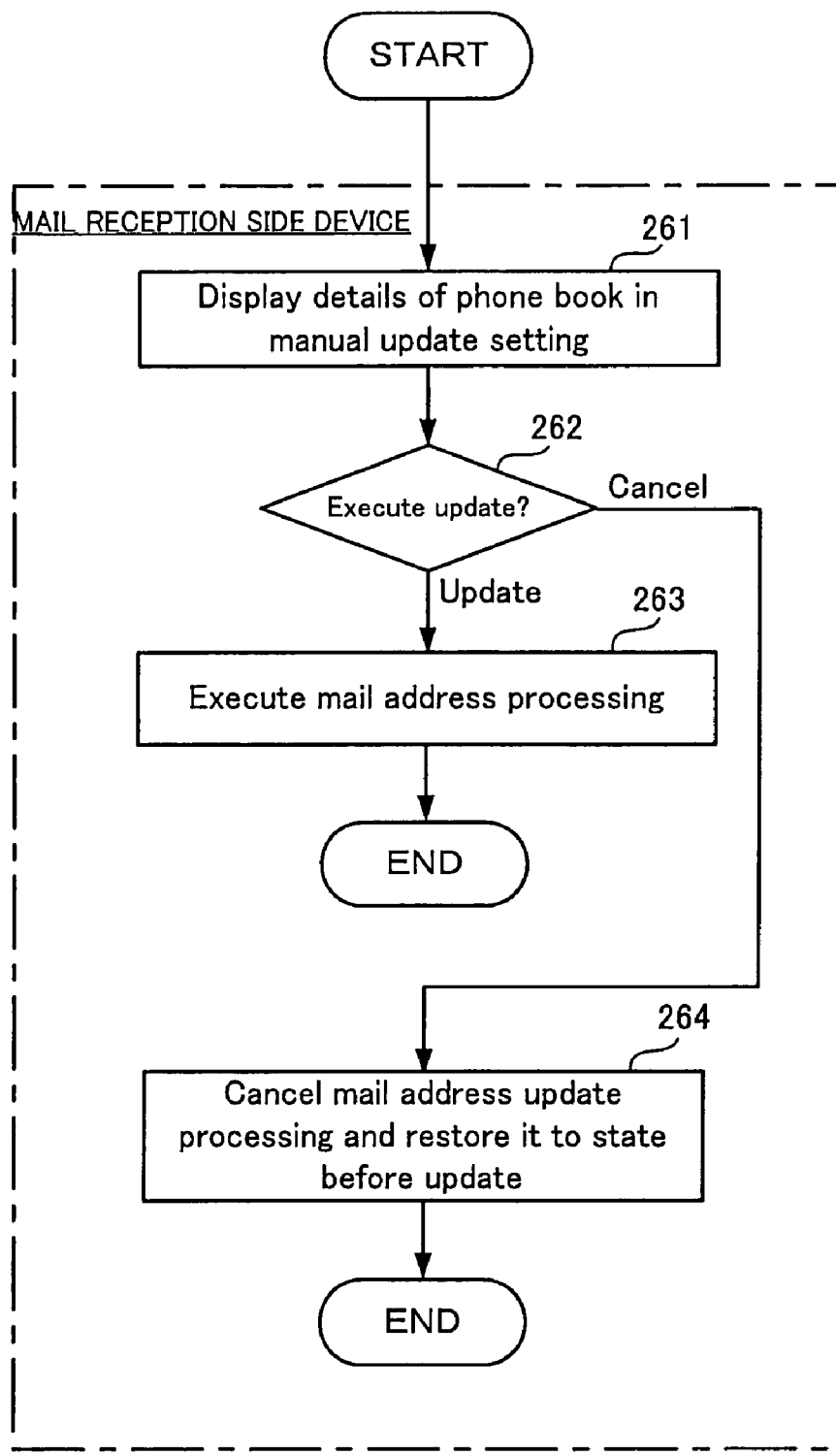
FIG. 16 is a flowchart showing an update process and a cancellation process of the mail address when an automatic update mode of the mail address is not set (when the automatic update mode is set).

FIG. 16 is a flowchart showing the update process and cancellation process of the mail address when the automatic update mode of the mail address is not set (when a manual update mode is set).

In the case where the manual update mode is set, an automatic update to a new mail address is not performed even when it is known that the mail address registered with the phone book is an old mail address. Thus, in this case, the details of the phone book about the update are displayed (step 261), and if an update executing operation is performed (step 262), the update process of the mail address is executed (step 263). If the mail address is once updated and then cancelled, the update of the mail address once updated is cancelled and restored to the mail address before the update (step 264).

Thus, according to this embodiment, the mail address before the update is stored even in the case where the mail address is manually updated as in the case of the automatic update mode so as to cancel the update according to an update canceling operation. It is thereby possible to easily restore an update which has been inadvertently performed by the user.

Figure 17:
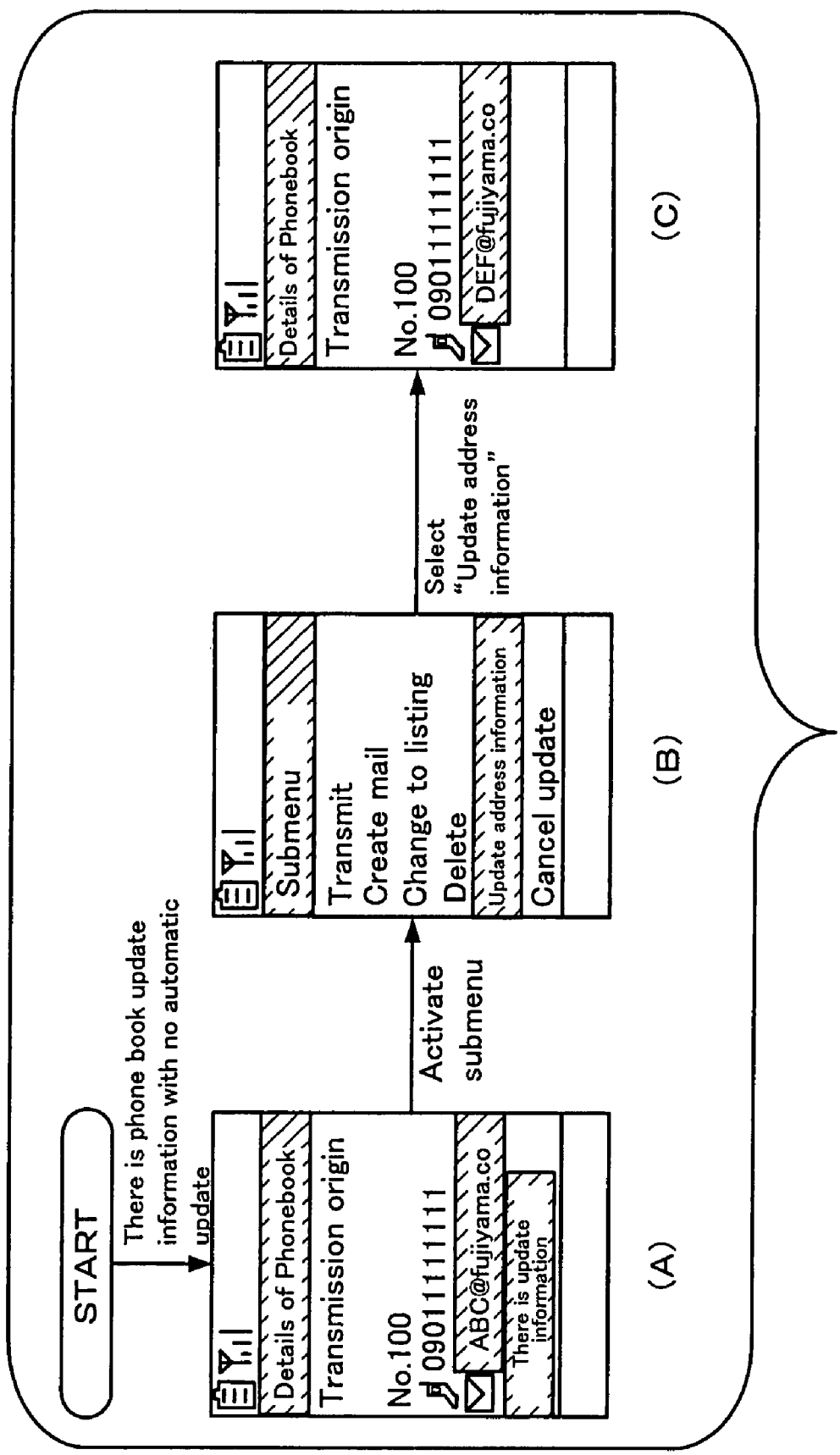
FIG. 17 is a diagram showing a phone book detail screen when a manual update mode corresponding to the flowchart shown in FIG. 16 is set.

Parts (A)-(C) of FIG. 17 are diagrams showing a phone book detail screen when the manual update mode corresponding to the flowchart shown in FIG. 16 is set.

The phone book detail screen of part (A) of FIG. 17 is displayed by the menu operation from the standby display when the manual update mode is set or the operation of pushing the decision button when the manual update mode is set and the screen of part (A) of FIG. 12 is displayed by mail reception. The phone book details of part (A) of FIG. 17 display ABC@fujiyama.co.jp which is the mail address before the update.

Thus, if the submenu is activated and "address information update" is selected (part (B) of FIG. 17), the mail address is updated to the new mail address DEF@fujiyama.com (part (C) of FIG. 17).

After the mail address is once updated, if the phone book details are displayed and "cancellation of update" is selected from the screen shown in part (B) of FIG. 15, the mail address once updated (DEF@fujiyama.com in the example shown here) is restored to the mail address before the update (ABC@fujiyama.co.jp in the example shown here).

Figure 18:
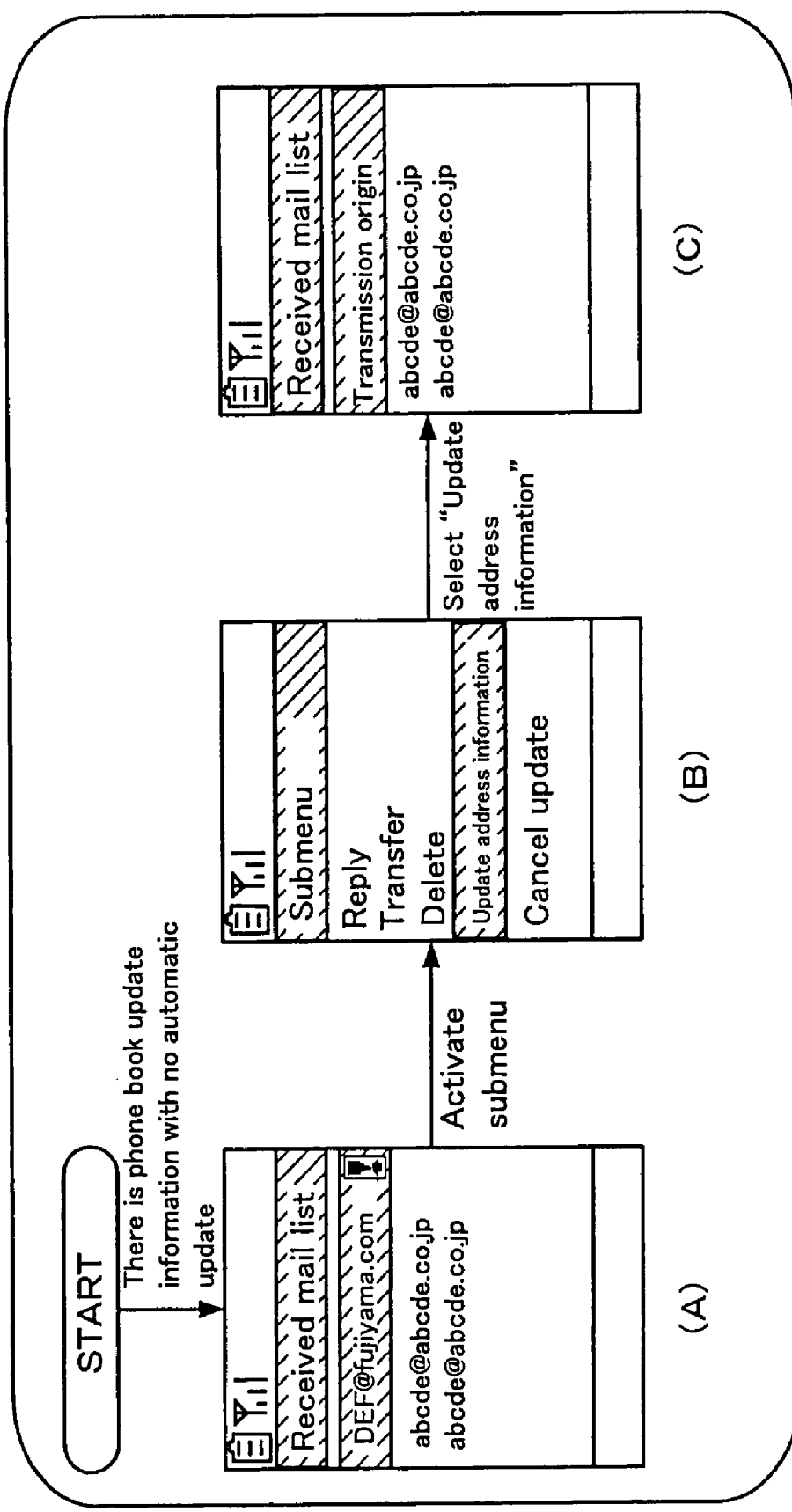
FIG. 18 is a diagram showing received mail list screens.

Parts (A)-(C) of FIG. 18 are diagrams showing received mail list screens on opening the received mail. FIG. 18 also corresponds to the flowchart shown in FIG. 16.

The received mail list screen of part (A) of FIG. 18 is displayed by a received mail opening operation. If one (DEF@fujiyama.com here) in the screen is selected and a submenu operation is performed, the screen of part (B) of FIG. 18 is displayed. If "address information update" is selected on that screen, the display of "DEF@fujiyama.com" till then is changed to "Transmission Origin" (name or nickname by which a specific transmission origin is identifiable as previously described). This means the following. The name "Transmission Origin" and the mail address "ABC@fujiyama.co.jp" were correspondingly registered with the phone book before the update. As a result of the update of this time, "ABC@fujiyama.co.jp" was updated to "DEF@fujiyama.com". Consequently, "DEF@fujiyama.com" is associated with "Transmission Origin" so that "Transmission Origin" is displayed on the screen.

Next, a variation of the embodiment will be described.

Figure 19:
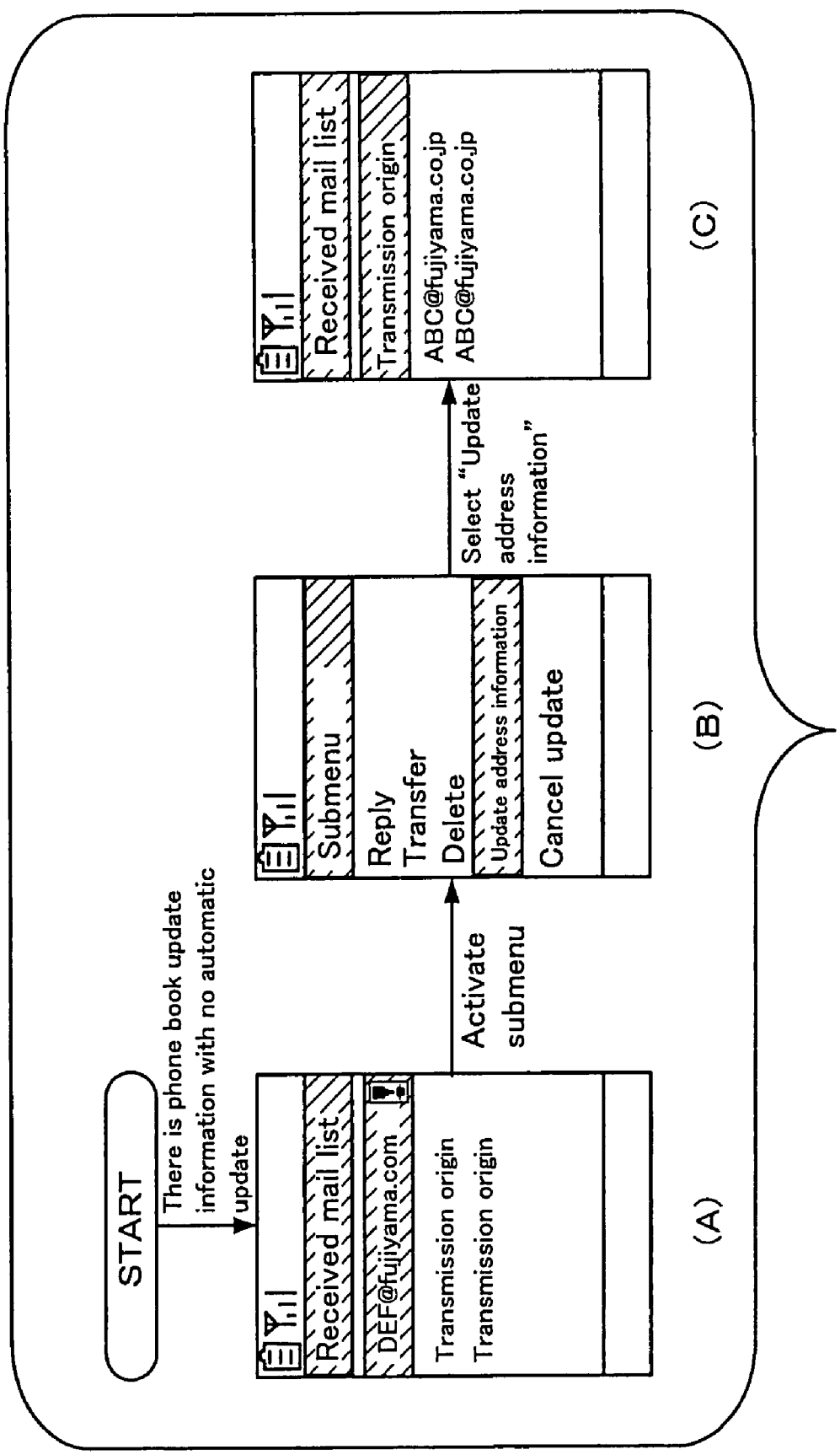
FIG. 19 is a diagram showing the received mail list screens of the embodiment.

Parts (A)-(C) of FIG. 19 are diagrams showing the received mail list screen of the embodiment. Parts (A)-(C) of FIG. 20 are diagrams showing the variation thereof.

In the example shown in Parts (A)-(C) of FIG. 19, "Transmission Origin" is associated with "ABC@fujiyama.co.jp" in the phone book as in the description of Parts (A)-(C) of FIG. 18. As shown in part (A) of FIG. 19, "DEF@fujiyama.com" which is a transmission origin address of the received mail of this time is not associated with "Transmission Origin". Part (A) of FIG. 19 represents that there have been three received mails including the received mail of this time, and also represents that the transmission origin address of the received mail of this time is "DEF@fujiyama.com" while the transmission origin address of the two received mails before that is "ABC@fujiyama.co.jp". Here, "ABC@fujiyama.co.jp" is associated with "Transmission Origin" in the phone book, and so "Transmission Origin" is displayed on the screen instead of "ABC@fujiyama.co.jp".

Here, if the submenu is opened and "address information update" is selected (part (B) of FIG. 19), then "DEF@fujiyama.com" is associated with "Transmission Origin" this time. As a result, "ABC@fujiyama.co.jp" is no longer associated with "Transmission Origin" so that "Transmission Origin" is displayed on the screen instead of "DEF@fujiyama.com". In addition, "ABC@fujiyama.co.jp" is disassociated from "Transmission Origin" so as to be displayed as is "ABC@fujiyama.co.jp", which may give the user an odd impression.

Figure 20:
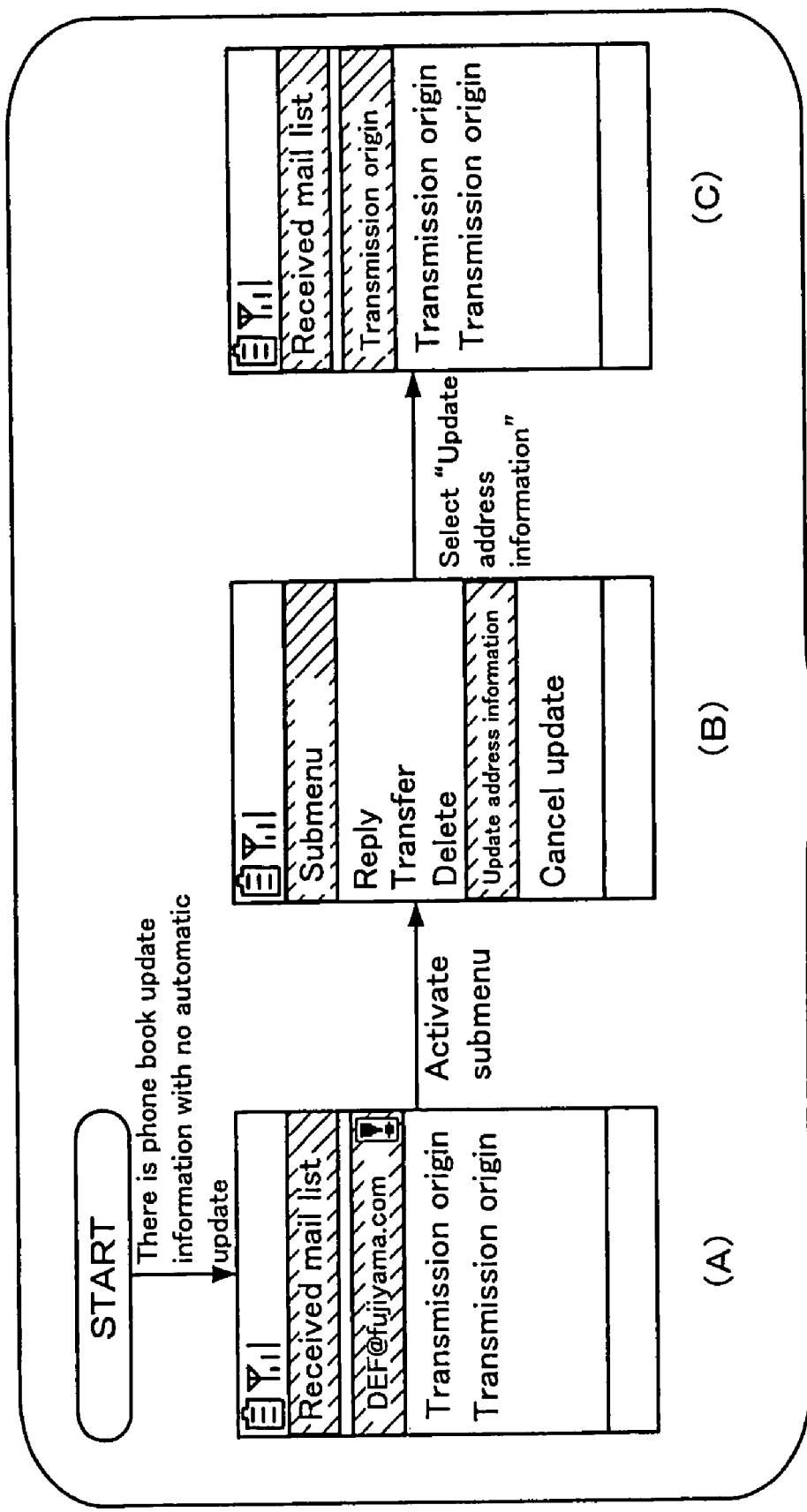
FIG. 20 is a diagram showing a variation.

FIGS. 20 are improved as to this point. To be more specific, parts of (A) and (B) of FIG. 20 are the same as parts (A) and (B) of FIG. 19. However, Part (c) of FIG. 20 means that, as a result of updating "ABC@fujiyama.co.jp" to "DEF@fujiyama.com", the mail address "DEF@fujiyama.com" after the update is also associated with "Transmission Origin" without disassociating the mail address "ABC@fujiyama.co.jp" before the update from "Transmission Origin". It is thus possible to prevent the odd impression described with reference to Parts (A)-(C) of FIG. 19 from being given by associating both the mail addresses before and after the update with the same "Transmission Origin".

Here, the description has been given by taking the cell-phones as the examples of the mail transmission device and mail reception device. However, personal computers or the like may also be used as the mail transmission device and mail reception device. The present invention is not limited to using the cell-phones.

What is claimed is:

1. A mail server comprising:
    an address-change accepting section which accepts a change of a mail address of a user device;
    an address-history management section which manages history of the mail addresses of the user device;
    a mail receiving section which receives a mail to a destination device from a transmission origin device;
    a mail transmitting section which attaches history of mail addresses of the transmission origin device to the received mail and transmits the mail having the history attached thereto to the destination device and
    wherein: the address-history management section manages the history of the mail addresses of the user device including a first mail address and all the mail addresses changed thereafter of the user device; and the mail transmitting section attaches, to a mail to be transmitted to the destination device, all the history of mail addresses of the transmission origin device of the mail managed by the address-history management section and transmits the mail having the history attached thereto to the destination device.

2. The mail server according to claim 1 wherein:
    the address-history management section manages the history of the mail addresses of the user device up to a mail address tracked back by a predetermined or larger number of times of change; and
    the mail transmitting section attaches, to a mail to be transmitted to the destination device, up to the history of the mail addresses tracked back by the predetermined number of times of change out of the history of mail addresses of the transmission origin device of the mail managed by the address-history management section and transmits the mail having the history attached thereto to the destination device.

3. A mail reception device comprising:
    an address-book management section which manages at least a mail address list of some user devices;
    a mail receiving section which receives a mail to which history of mail addresses of a transmission origin device is attached;
    a transmission-origin identification section which recognizes the transmission origin device of the mail received by the mail receiving section by checking the mail address recorded in the history attached to the mail against the mail address managed by the address-book management section;
    and a user notification section which notifies a user in a case where the transmission-origin identification section recognizes the transmission origin device of the mail received by the mail receiving section based on past mail addresses of the transmission origin device, and
    wherein the transmission-origin identification section checks the mail addresses recorded in the history attached to the mail received by the mail receiving section against the mail addresses managed by the address-book management section in an order of tracking back from a current mail address to past mail addresses.

4. The mail reception device according to claim 3, further comprising a receipt processing section which performs receipt processing according to the transmission origin device after the transmission origin device is recognized by the transmission-origin identification section.

5. The mail reception device according to claim 3, further comprising:
an automatic-update-mode setting section which sets up and releases an automatic update mode automatically updating a past mail address of the transmission origin device managed by the address-book management section to a current mail address of the transmission origin device following a user operation of setup and release respectively in a case where the transmission origin device is recognized based on the past mail addresses of the transmission origin device,
wherein, in a case where the automatic update mode is set, the address-book management section updates the past mail address of the transmission origin device managed by the address-book management section to the current mail address of the transmission origin device without waiting for the user operation after the transmission-origin identification section recognizes the transmission origin device of the mail received by the mail receiving section based on the past mail addresses of the transmission origin device.

6. The mail reception device according to claim 5, wherein the address-book management section restores the mail address automatically updated in the automatic update mode to the mail address before the update following a cancel operation by the user.

7. The mail reception device according to claim 5, wherein, when the automatic update mode is yet to be set and the transmission-origin identification section recognizes the transmission origin device of the mail received by the mail receiving section based on the past mail addresses of the transmission origin device, the address-book management section updates the past mail address of the transmission origin device managed by the address-book management section to the current mail address of the transmission origin device following an update operation by the user.

8. The mail reception device according to claim 3, wherein the user notification section notifies the user that the transmission-origin identification section has recognized the transmission origin device of the mail received by the mail receiving section based on the past mail addresses of the transmission origin device at least at one of time points of receiving the mail, opening the mail by the user operation, and displaying the mail addresses of the transmission origin device managed by the address-book management section.

9. A computer readable medium storing a mail server program to be executed in an information processing device having a program executing function and a data transmitting and receiving function, the program causing the information processing device to operate as a mail server comprising:
an address-change accepting section which accepts a change of a mail address of a user device;
an address-history management section which manages history of the mail addresses of the user device;
a mail receiving section which receives a mail to a destination device from a transmission origin device;
a mail transmitting section which attaches history of mail addresses of the transmission origin device to the received mail and transmits the mail having the history attached thereto to the destination device;
wherein: the address-history management section manages the history of the mail addresses of the user device including a first mail address and all the mail addresses changed thereafter of the user device; and
the mail transmitting section attaches, to a mail to be transmitted to the destination device, all the history of mail addresses of the transmission origin device of the mail managed by the address-history management section and transmits the mail having the history attached thereto to the destination device.

10. The medium according to claim 9, wherein:
the address-history management section manages the history of the mail addresses of the user device up to a mail address tracked back by a predetermined or larger number of times of change; and
the mail transmitting section attaches, to a mail to be transmitted to the destination device, up to the history of the mail addresses tracked back by the predetermined number of times of change out of the history of mail addresses of the transmission origin device of the mail managed by the address-history management section and transmits the mail having the history attached thereto to the destination device.

11. A computer readable medium storing a mail reception program to be executed in an information processing device having a program executing function and a data receiving function, the program causing the information processing device to operate as a mail reception device comprising:
an address-book management section which manages at least a mail address list of some user devices;
a mail receiving section which receives a mail to which history of mail addresses of a transmission origin device is attached;
a transmission-origin identification section which recognizes the transmission origin device of the mail received by the mail receiving section by checking the mail address recorded in the history attached to the mail against the mail address managed by the address-book management section;
a user notification section which notifies a user in a case where the transmission-origin identification section recognizes the transmission origin device of the mail received by the mail receiving section based on past mail addresses of the transmission origin device, and
wherein the transmission-origin identification section checks the mail addresses recorded in the history attached to the mail received by the mail receiving section against the mail addresses managed by the address-book management section in an order of tracking back from a current mail address to past mail addresses.

12. The medium according to claim 11, wherein the information processing device is caused to operate as the mail reception device further comprising a receipt processing section which performs receipt processing according to the transmission origin device after the transmission origin device is recognized by the transmission-origin identification section.

13. The medium according to claim 11, wherein the information processing device is caused to operate as the mail reception device further comprising:
an automatic-update-mode setting section which sets up and releases an automatic update mode automatically updating a past mail address of the transmission origin device managed by the address-book management section to a current mail address of the transmission origin device following a user operation of setup and release respectively in a case where the transmission origin device is recognized based on the past mail addresses of the transmission origin device,
wherein, in a case where the automatic update mode is set, the address-book management section updates the past mail address of the transmission origin device managed by the address-book management section to the current mail address of the transmission origin device without waiting for the user operation after the transmission-origin identification section recognizes the transmission origin device of the mail received by the mail receiving section based on the past mail addresses of the transmission origin device.

14. The medium according to claim 13, wherein the address-book management section restores the mail address automatically updated in the automatic update mode to the mail address before the update following a cancel operation by the user.

15. The medium according to claim 13, wherein, when the automatic update mode is yet to be set and the transmission-origin identification section recognizes the transmission origin device of the mail received by the mail receiving section based on the past mail addresses of the transmission origin device, the address-book management section updates the past mail address of the transmission origin device managed by the address-book management section to the current mail address of the transmission origin device following an update operation by the user.

16. The medium according to claim 11, wherein the user notification section notifies the user that the transmission-origin identification section has recognized the transmission origin device of the mail received by the mail receiving section based on the past mail addresses of the transmission origin device at least at one of time points of receiving the mail, opening the mail by the user operation, and displaying the mail addresses of the transmission origin device managed by the address-book management section by the user operation.

17. A mail mediation method comprising:
an address-history management step which accepts a change of a mail address of a user device and manages history of the mail addresses of the user device;
a mail receiving step which receives a mail to a destination device from a transmission origin device;
a mail transmitting step which attaches the history of the mail addresses of the transmission origin device to the received mail and transmits the mail having the history attached thereto to the destination device and wherein:
the address-history management step is a step which manages the history of the mail addresses of the user device including a first mail address and all the mail addresses changed thereafter of the user device;
the mail transmitting step is a step which attaches, to a mail to be transmitted to the destination device, all the history of the mail addresses of the transmission origin device of the mail managed by the address-history management step and transmits the mail having the history attached thereto to the destination device.

18. The mail mediation method according to claim 17, wherein:
the address-history management step is a step which manages the history of the mail addresses of the user device up to a mail address tracked back by a predetermined or larger number of times of change; and
the mail transmitting step is a step which attaches up to the history of the mail addresses tracked back by the predetermined number of times of change out of the history of mail addresses of the transmission origin device of the mail managed by the address-history management step to the mail transmitted to the destination device and transmits the mail having the history attached thereto to the destination device.

19. A mail reception method comprising:
an address-book management step which manages at least a mail address list of some user devices;
a mail receiving step which receives a mail having history of mail addresses of a transmission origin device attached thereto;
a transmission-origin identification step which recognizes the transmission origin device of the mail received by the mail receiving step by checking the mail address recorded in the history attached to the mail against the mail address managed by the address-book management step;
a user notification step which notifies a user in a case where the transmission-origin identification step recognizes the transmission origin device of the mail received by the mail receiving step based on past mail addresses of the transmission origin device, and wherein the transmission-origin identification step checks the mail addresses recorded in the history attached to the mail received by the mail receiving step against the mail addresses managed by the address-book management step in an order of tracking back from a current mail address to past mail addresses.

20. The mail reception method according to claim 19, further comprising a receipt processing step which performs receipt processing according to the transmission origin device after the transmission origin device is recognized by the transmission-origin identification step.

21. The mail reception method according to claim 19, further comprising:
an automatic-update-mode setting step which sets up and releases an automatic update mode automatically updating the past mail address of the transmission origin device managed by the address-book management step to the current mail address of the transmission origin device following a user operation of setup and release respectively in a case where the transmission origin device is recognized based on the past mail addresses of the transmission origin device,
wherein, in a case where the automatic update mode is set, the address-book management step updates the past mail address of the transmission origin device managed by the address-book management step to the current mail address of the transmission origin device without waiting for the user operation after the transmission-origin identification step recognizes the transmission origin device of the mail received by the mail receiving step based on the past mail addresses of the transmission origin device.

22. The mail reception method according to claim 21, wherein the address-book management step is a step which restores the mail address automatically updated in the automatic update mode to the mail address before the update following a cancel operation by the user.

23. The mail reception method according to claim 21, wherein, in a case where the automatic update mode is yet to be set and the transmission-origin identification step has recognized the transmission origin device of the mail received by the mail receiving step based on the past mail addresses of the transmission origin device, the address-book management step is a step which updates the past mail address of the transmission origin device managed by the address-book management step to the current mail address of the transmission origin device following an update operation by the user.

24. The mail reception method according to claim 19, wherein the user notification step is a step which notifies the user that the transmission origin device of the mail received by the mail receiving step has been recognized by the transmission-origin identification step based on the past mail addresses of the transmission origin device at least at one of time points of receiving the mail, opening the mail by the user operation, and displaying the mail addresses of the transmission origin device managed by the address-book management step by the user operation.

* * * * *

UNITED STATES PATENT AND TRADEMARK OFFICE
CERTIFICATE OF CORRECTION

PATENT NO. : 7,685,243 B2
APPLICATION NO. : 11/889627
DATED : March 23, 2010
INVENTOR(S) : Tomohiro Yoshii It is certified that error appears in the above-identified patent and that said Letters Patent is hereby corrected as shown below:

Column 20, Line 27, change "claim 1" to --claim 1,--.

Column 23, Lines 65-67 and Column 24, Lines 1-22, claim 19, change
"19. A mail reception method comprising:
   an address-book management step which manages at least a mail address list of some user devices;
   a mail receiving step which receives a mail having history of mail addresses of a transmission origin device attached thereto;
   a transmission-origin identification step which recognizes the transmission origin device of the mail received by the mail receiving step by checking the mail address recorded in the history attached to the mail against the mail address managed by the address-book management step;
   a user notification step which notifies a user in a case where the transmission-origin identification step recognizes the transmission origin device of the mail received by the mail receiving step based on past mail addresses of the transmission origin device, and wherein the transmission-origin identification step checks the mail addresses recorded in the history attached to the mail received by the mail receiving step against the mail addresses managed by the address-book management step in an order of tracking back from a current mail address to past mail addresses." to
   --19. A mail reception method comprising:
   an address-book management step which manages at least a mail address list of some user devices;
   a mail receiving step which receives a mail having history of mail addresses of a transmission origin device attached thereto;
   a transmission-origin identification step which recognizes the transmission origin device of the mail received by the mail receiving step by checking the mail address recorded in the history attached to the mail against the mail address managed by the address-book management step;
   a user notification step which notifies a user in a case where the transmission-origin identification step recognizes the transmission origin device of the mail received by the mail receiving step based on past mail addresses of the transmission origin device, and Signed and Sealed this Tenth Day of August, 2010

David J. Kappos
*Director of the United States Patent and Trademark Office* wherein the transmission-origin identification step checks the mail addresses recorded in the history attached to the mail received by the mail receiving step against the mail addresses managed by the address-book management step in an order of tracking back from a current mail address to past mail addresses.--.